US010366264B2

(12) United States Patent
Kim et al.

(10) Patent No.: US 10,366,264 B2
(45) Date of Patent: Jul. 30, 2019

(54) SYSTEM AND METHOD FOR TRANSFERRING CONTENT AMONG DEVICES

(71) Applicant: Korea Advanced Institute of Science and Technology, Daejeon (KR)

(72) Inventors: Sang Sik Kim, Daejeon (KR); Joon Yeong Park, Daejeon (KR); Sung Kwan Jung, Daejeon (KR); Jun Seok Park, Daejeon (KR); Yong Chul Shin, Daejeon (KR); Yong Rok Kim, Daejeon (KR); Hyo Ju Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1392 days.

(21) Appl. No.: 14/453,359

(22) Filed: Aug. 6, 2014

(65) Prior Publication Data

US 2015/0046836 A1    Feb. 12, 2015

(30) Foreign Application Priority Data

Aug. 9, 2013   (KR) .......................... 10-2013-0095008
Oct. 2, 2013   (KR) .......................... 10-2013-0117766
Oct. 16, 2013  (KR) .......................... 10-2013-0123550
Jan. 20, 2014  (KR) .......................... 10-2014-0006456
Jun. 9, 2014   (KR) .......................... 10-2014-0069303
Jul. 7, 2014   (KR) .......................... 10-2014-0084721

(51) Int. Cl.
*G06F 3/03*     (2006.01)
*G06K 7/14*     (2006.01)
(Continued)

(52) U.S. Cl.
CPC ............ *G06K 7/1404* (2013.01); *G06F 3/03* (2013.01); *G06F 3/0481* (2013.01);
(Continued)

(58) Field of Classification Search
CPC ...... G06F 3/0481; G06F 3/0488; G06F 3/041; G06F 3/0484; H04L 29/08; G06K 7/1404
See application file for complete search history.

(56) References Cited

U.S. PATENT DOCUMENTS

2007/0001853 A1*  1/2007  Otranen ............... G06K 7/0008
                                                340/572.1
2009/0244015 A1* 10/2009  Sengupta .............. H04W 4/21
                                                   345/173
(Continued)

FOREIGN PATENT DOCUMENTS

KR   2011-0010096 A    1/2011
KR   2011-0060062 A    6/2011
(Continued)

*Primary Examiner* — William L Bashore
*Assistant Examiner* — Gregory A Distefano
(74) *Attorney, Agent, or Firm* — Marshall, Gerstein & Borun LLP

(57) ABSTRACT

A system and method for transferring content among multiple devices are disclosed. Herein, the system for transferring content may include a coupling controller configured to identify a user equipment in accordance with a content transfer request and to perform coupling with the identified user equipment, and a content transfer unit configured to transmit content to the user equipment or to receive content from the user equipment, when coupling is completed.

13 Claims, 30 Drawing Sheets

Case 1

Case 2

Case 3

(51) Int. Cl.
 *H04L 29/08* (2006.01)
 *G06Q 30/02* (2012.01)
 *G06K 7/10* (2006.01)
 *G06F 3/0481* (2013.01)
 *G08C 23/04* (2006.01)
 *G06F 3/0488* (2013.01)

(52) U.S. Cl.
 CPC ....... *G06F 3/04883* (2013.01); *G06K 7/1092* (2013.01); *G06Q 30/0267* (2013.01); *G08C 23/04* (2013.01); *H04L 67/06* (2013.01); *H04L 67/2823* (2013.01); *G06F 2203/04808* (2013.01); *G06K 2007/10524* (2013.01); *G08C 2201/50* (2013.01)

(56) References Cited

U.S. PATENT DOCUMENTS

| | | | | |
|---|---|---|---|---|
| 2010/0081375 A1* | 4/2010 | Rosenblatt | ............ | G08C 17/02 455/41.1 |
| 2010/0082445 A1* | 4/2010 | Hodge | ............ | G06Q 20/10 705/21 |
| 2012/0150669 A1* | 6/2012 | Langley | ............ | G06Q 30/0601 705/16 |
| 2012/0154292 A1 | 6/2012 | Zhao et al. | | |
| 2013/0040567 A1* | 2/2013 | Matsubara | ............ | G06F 3/0488 455/41.1 |
| 2013/0316650 A1* | 11/2013 | Reed | ............ | H04B 7/24 455/41.2 |
| 2014/0176991 A1* | 6/2014 | Yun | ............ | H04W 76/14 358/1.15 |
| 2015/0213783 A1* | 7/2015 | Yan | ............ | G06F 1/1698 345/173 |

FOREIGN PATENT DOCUMENTS

| | | |
|---|---|---|
| KR | 2011-0063410 A | 6/2011 |
| KR | 2012-0060223 A | 6/2012 |
| KR | 2012-0062929 A | 6/2012 |
| KR | 2012-0106458 A | 9/2012 |
| KR | 2013-0033667 A | 4/2013 |
| KR | 2013-0061711 A | 6/2013 |

* cited by examiner

FIG. 17
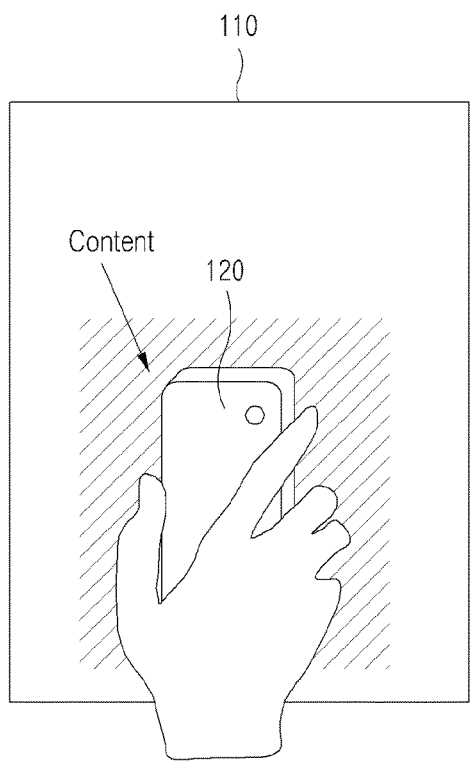
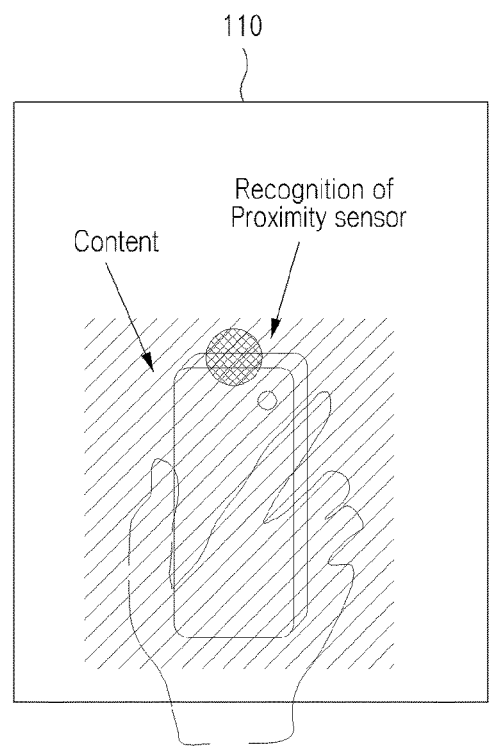

SYSTEM AND METHOD FOR TRANSFERRING CONTENT AMONG DEVICES

This application claims the benefit of the Korean Patent Application No. 10-2013-0095008, filed on Aug. 9, 2013, the Korean Patent Application No. 10-2013-0117766, filed on Oct. 2, 2013, the Korean Patent Application No. 10-2013-0123550, filed on Oct. 16, 2013, the Korean Patent Application No. 10-2014-0006456, filed on Jan. 20, 2014, the Korean Patent Application No. 10-2014-0069303, filed on Jun. 9, 2014, and the Korean Patent Application No. 10-2014-0084721, filed on Jul. 7, 2014, which are hereby incorporated by references as if fully set forth herein.

BACKGROUND OF THE INVENTION

Field of the Invention

The exemplary embodiments of the present invention relate to a system and method for intuitively transferring content among multiple devices.

Discussion of the Related Art

As a communication tool that can lead to marketing, advertisement, training effects, and user experience, digital signage corresponds to a digital image device that can provide not only broadcast programs but also specific information in public facilities, such as department stores, subway stations, bus stations, airports, hotels, hospitals, and so on.

In order to use digital signage, a technology that can transfer (or relocate), content wanted by a user, among diverse digital signage content, to user equipments (or devices) of multiple users and that can transfer wanted content to a digital signage from the user's terminal (or user equipment) is being required.

SUMMARY OF THE INVENTION

Accordingly, the present invention is directed to a system and method for transferring content among devices that substantially obviate one or more problems due to limitations and disadvantages of the related art.

An object of the present invention is to provide a system and method that can transfer content among devices by a simple input.

Another object of the present invention is to provide a system and method that can select content and a target device by using an intuitive method and that can transfer content wanted by a user to a wanted device without having to provide the user with any special instruction (or education).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a coupling controller configured to identify a user equipment in accordance with a content transfer request and to perform coupling with the identified user equipment, and a content transfer unit configured to transmit content to the user equipment or to receive content from the user equipment, when coupling is completed.

According to another aspect of the present invention, a user equipment includes a coupling controller configured to respond to status information respective to a request made by a display device, and to perform coupling with the display device, when the status information corresponds to recognition information within the display device, and a content transfer unit configured to transmit content to the display device or to receive content from the display device, when coupling is completed.

According to yet another aspect of the present invention, a user equipment includes a coupling controller configured to recognize an optical signal pattern in accordance with a driving of an optical radiation device by using a camera image recording the display device, wherein the optical radiation device is attached to the display device, and to perform coupling with the display device by using the optical signal pattern, and a content transfer unit configured to transmit content to the display device or to receive content from the display device, when coupling is completed.

According to yet another aspect of the present invention, an advertisement system includes a memory configured to have at least one program loaded therein, and at least one processor. And, herein, in accordance with a control of the at least one program, the at least one processor may be configured to perform a process of exposing advertisements through a screen area of a display device, a process of receiving information on a specific advertisement among the exposed advertisements from the display device, the specific advertisement being selected by a user, and a process of transmitting content related to the specific advertisement to the display device or to a user equipment of the user in accordance with the received information.

According to yet another aspect of the present invention, an advertisement system includes an advertisement platform configured to register an advertisement of an advertiser and to maintain the registered advertisement, a display device configured to expose the advertisement received by the advertisement platform, and a user equipment device configured to receive content related to a specific advertisement from the advertisement platform or a content device with respect to the specific advertisement among the exposed advertisements exposed on the display device, the specific advertisement being selected by a user.

According to a further aspect of the present invention, as a method for transferring content being realized by a computer, the method for transferring content includes a step of identifying a user equipment in accordance with a content transfer request and performing coupling with the identified user equipment, and a step of transmitting content to the user equipment or receiving content from the user equipment, when coupling is completed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 to FIG. 28 illustrate diverse methods for transferring content according to an exemplary embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention relates to a system and method for transferring content via coupling of devices by using an intuitive method.

Figure 1:
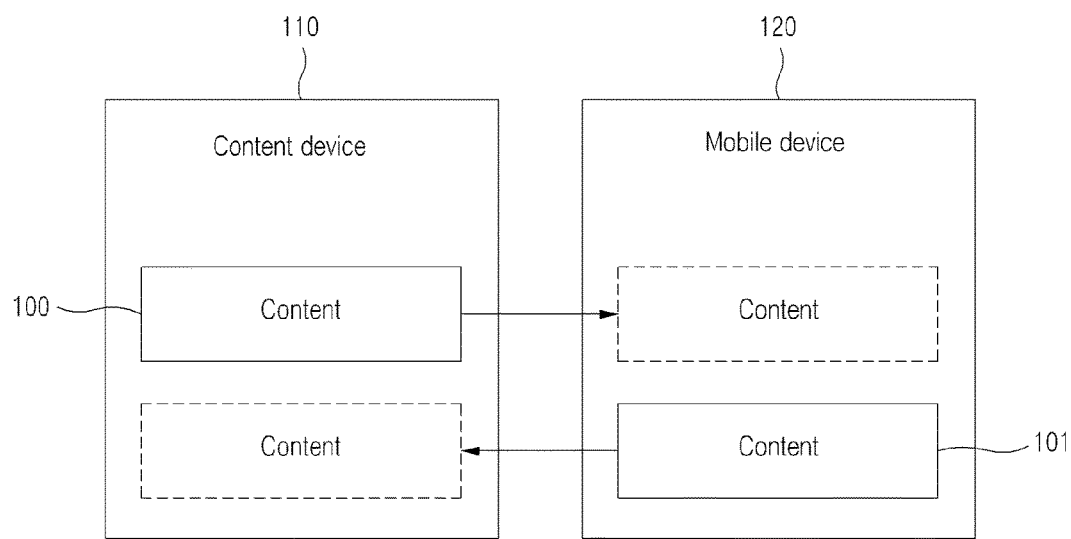
FIG. 1 illustrates a system for transferring content among device according to an exemplary embodiment of the present invention.

FIG. 1 illustrates a system for transferring content among device according to an exemplary embodiment of the present invention.

Referring to FIG. 1, a system for transferring content among device according to an exemplary embodiment of the present invention may include a content device 110 and a mobile device 120.

The content device 110 corresponds to a display device that is installed in public facilities, and the content device 110 may include a display through which a touch input can be inputted. For example, the content device 110 may correspond to a digital signage, and so on.

The mobile device 120 corresponds to a user equipment device that can be used by an individual user, and, herein, the mobile device 120 may also include a display through which a touch input can be inputted. For example, the mobile device 120 may correspond to a smart phone, a tablet personal computer (PC), a laptop computer, a wearable computer, and so on.

In order to establish coupling between the content device 110 and the mobile device 120, a method of having the mobile device 120 respond to a request made by the content device 110 or a method of having the content device 110 respond to a request made by the mobile device 120 may be applied.

For example, when a touch input is inputted to the display of the content device 110 by the user from the content device 110, the content device 110 may identify the mobile device 120 of the corresponding user and establish coupling (hereinafter referred to as a 'touch based coupling method').

In another example, the mobile device 120 provides an environment allowing the user to select a content device 110 through the mobile device 120, and, then, the mobile device 120 identifies the selected content device 110 so as to establish coupling (hereinafter referred to as a 'non-touch based coupling method').

The system for transferring content according to the present invention may automatically perform coupling between the content device 110 and the mobile device 120, thereby transferring content within the content device 110 to the mobile device 120, or transferring content within the mobile device 120 to the content device 110.

Figure 2:
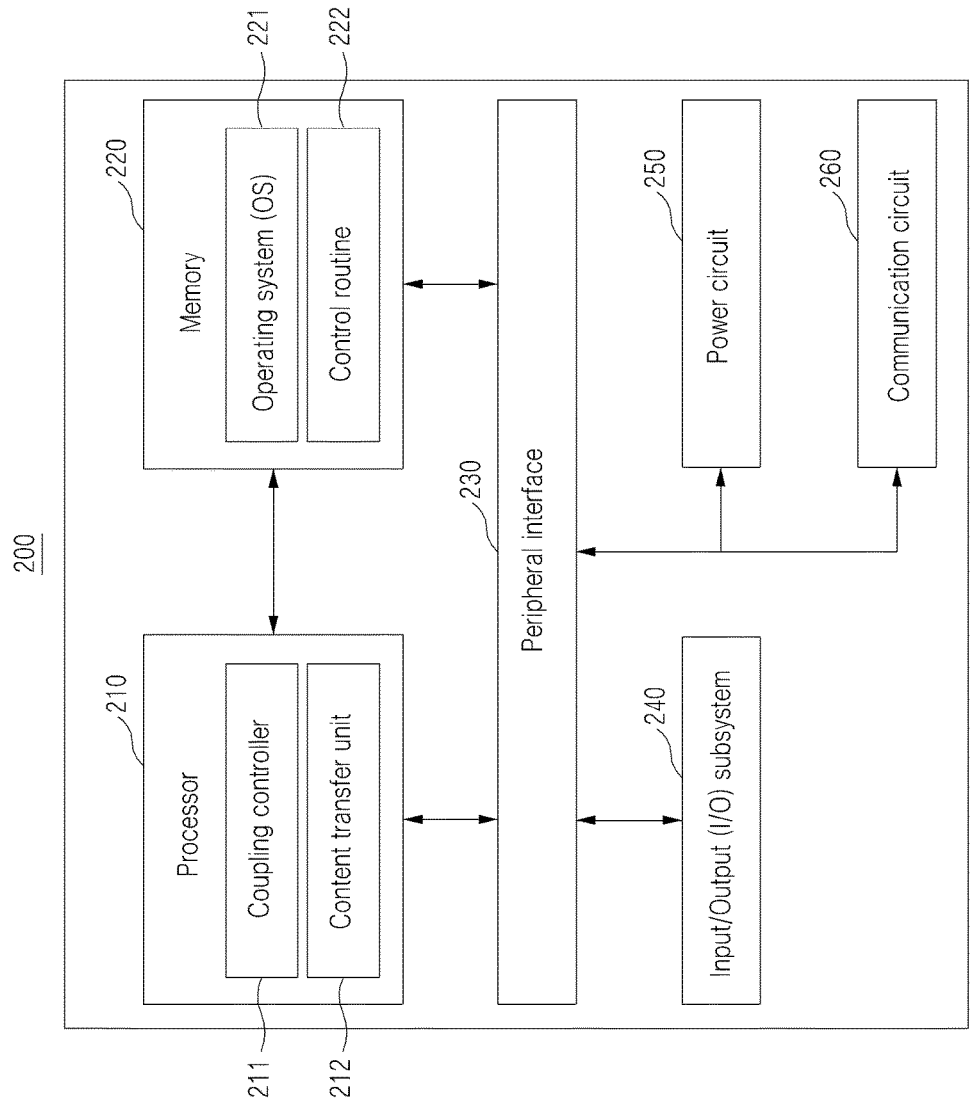
FIG. 2 illustrates a block view showing an exemplary internal structure of a computer system according to an exemplary embodiment of the present invention.

FIG. 2 illustrates a block view showing an exemplary internal structure of a computer system according to an exemplary embodiment of the present invention.

As shown in FIG. 2, a computer system 200 may include at least one of a processor 210, a memory 220, a peripheral interface 230, an input/output (I/O) subsystem 240, a power circuit 250, and a communication circuit 260. At this point, the computer system 220 may correspond to a content device and a mobile device.

In FIG. 2, arrows indicate that communication and data transmission can be performed between components (or elements) of the computer system, and such communication and data transmission may be performed by using high-speed serial bus, parallel bus, Storage Area Network (SAN), and/or other adequate communication technologies.

The memory 220 may include an operating system 221 and a control routine 222. For example, the memory 220 may include a high-speed random access memory, a magnetic disc, a static random access memory (SRAM), a dynamic random access memory (DRAM), a Read-only memory (ROM), a flash memory, or a non-volatile memory. The memory 220 may store program codes for the operating system 221 and the control routine 222. In other words, the memory 220 may include software modules, command sets (or instruction sets), or other variety of data that are required for the operation of the computer system 200. At this point, access of other components, such as the processor 210 or the peripheral interface 230, to the memory 220 may be controlled by the processor 210.

The peripheral interface 230 may couple an input and/or output peripheral device of the computer system 200 to the processor 210 and memory 220. The processor 210 may execute a software module or command set, which is stored in the memory 220, so as to be capable of performing diverse functions for the computer system 200 and processing data.

The input/out (I/O) subsystem 240 may couple diverse input/output peripheral devices to the peripheral interface 230. For example, the I/O subsystem 240 may include a controller, which is configured to couple diverse peripheral devices, such as a monitor or keyboard, a mouse, a printer, a touchscreen or camera, optical radiation devices, or diverse sensors, to the peripheral interface 230 as required. According to another aspect, the input/output peripheral devices may also be coupled to the peripheral interface 230 without passing through the input/output subsystem 240.

The power circuit 250 may provide power to all or some of the components of the user equipment (or user device). For example, the power circuit 250 may include a power management system, one or more power system, such as a battery or alternating current (AC), and so on, a charging (or re-charging) system, a power failure detection circuit, a power converter or inverter, a power status indicator, or other arbitrary components configured to perform power generation, management, and distribution.

The communication circuit 260 may allow communication to be performed with another computer system by using at least one external port. Alternatively, as described above, whenever required, the communication circuit 260 may include a radio frequency (RF) circuit, and, by transmitting/receiving (or transceiving) an RF signal, which is also well-known as an electromagnetic signal, communication may be established with another computer system.

By performing basic arithmetic and logical calculations and input/output calculations, the processor 210 may be configured to process commands of a computer program.

The processor 210 may be configured to execute a program code for a coupling controller 211 and a content transfer unit 212. Such program code may be stored in a recording device such as the memory 220.

The coupling controller 211 and the content transfer unit 212 may be configured to perform a method for transferring content, which will hereinafter be described in detail.

The above-described exemplary embodiment of FIG. 2 is merely an example of the computer system 200, and, therefore, some of the components shown in FIG. 2 may be omitted from the computer system 200, or some components that are not shown in FIG. 2 may be added to the computer system 200, or the computer system 200 may be configured to have 2 or more components combined therein. For example, apart from the components shown in FIG. 2, a computer system for a communication terminal (or communication device) in a mobile communication environment may further include a touchscreen or a sensor, and so on. And, the computer system may also include a circuit for RF communication using diverse communication methods (e.g., Wi-Fi, 3G, LTE, Bluetooth, NFC, Zigbee, and so on). Components that can be inputted in the computer system 200 may be realized in forms of hardware including at least one or more direct circuits specialized for signal processing or applications, software, or a combination of both hardware and software.

First of all, a method for transferring content by using a touch based coupling method will hereinafter be described in detail.

A content device may recognize a touch input of a user, which is inputted for content transfer. And, at this point, the touch input may consist of a single touch, a multi-touch, an unusual touch (or unique touch), and so on.

Figure 3:
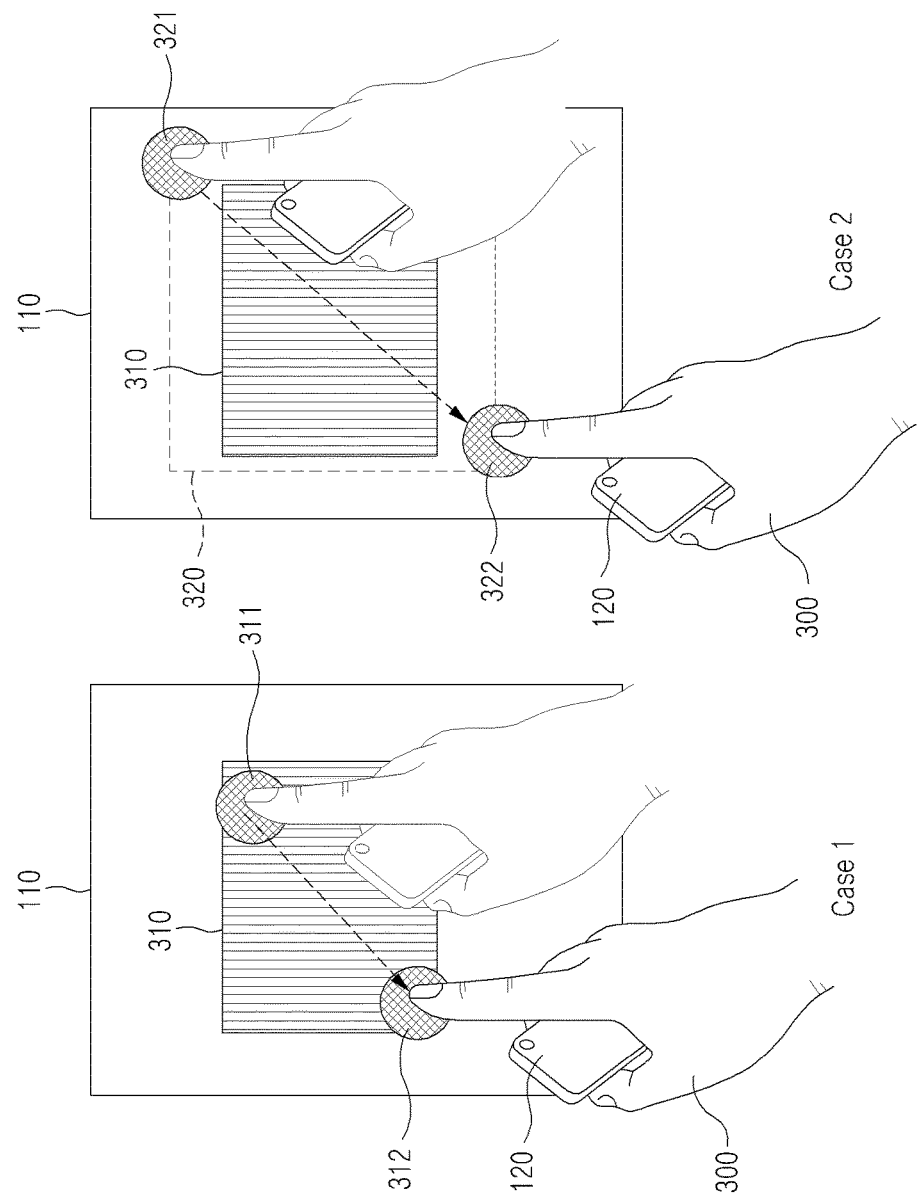
FIG. 3 to FIG. 8 illustrate diverse exemplary touch inputs for performing content transfer according to an exemplary embodiment of the present invention.

FIG. 3 illustrates an exemplary touch input for performing content transfer according to an exemplary embodiment of the present invention.

As shown in Case 1 of FIG. 2, the user may touch an area (or a first area) 311 of a content 310, which is displayed on a display of the content device 110, with a hand 300 that is grabbing (or holding) the mobile device 120. Thereafter, the user may drag his (or her) hand 300 from the initial area (or first area) 311 of the content to another area (or second area) 312. At this point, instead of dragging his (or her) hand 300, the user may also input a touch command direction the initial area 311 to the other area (or second area) 312 by sweeping or flicking his (or her) hand 300.

Additionally, as shown in Case 2 of FIG. 3, the user may touch a neighboring area (or first neighboring area) 321 of the content 310 by using his (or her) hand 300 and may drag his or her) hand 300 from the touched area 321 to another neighboring area (or second neighboring area) 322 of the content 310 opposite to the first area 321. At this point, instead of dragging his (or her) hand 300, the user may also input a touch command direction the initial area 321 to the opposite area 322 by sweeping or flicking his (or her) hand 300.

Accordingly, the content device 110 may receive recognition information of the mobile device 120 from the mobile device 120. And, when a position of the mobile device 120 is shifted (or relocated) to a distance from the first areas 311 and 321 to the other areas (or second areas) 312 and 322 along the direction from the first areas 311 and 321 to the other areas (or second areas) 312 and 322, or when a relocation time of the mobile device 120 coincides with a time point at which the drag motion is inputted, the content device 110 may determine that the mobile device 120 was held in the user's hand 300, and the content device 110 may then recognize the determined result as a touch input for performing content transfer.

Figure 4:
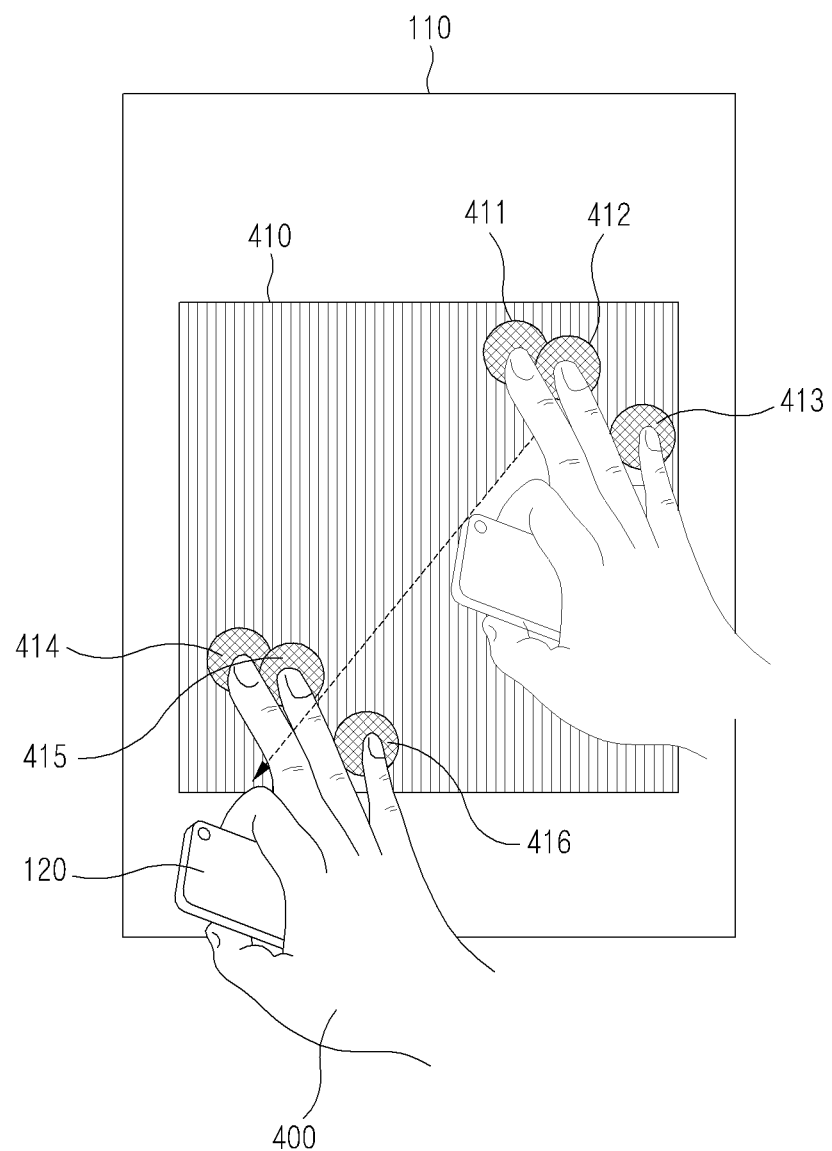

FIG. 4 illustrates another exemplary touch input for performing content transfer according to an exemplary embodiment of the present invention.

As shown in FIG. 4, the user may touch a first area 411, a second area 412, and a third area 413 with a hand 400 that is holding the mobile device 120. Thereafter, the user may respectively drag his (or her) hand 300 that is touching the first area 411, the second area 412, and the third area 413 to a fourth area 414, a fifth area 415, and a sixth area 416. More specifically, when the user inputs a dragging, sweeping, and flicking motion along the same direction by using multiple fingers, the content device 110 may determine that the user wishes to transfer a map content 410 to the mobile device 120.

At this point, the content device 110 may receive recognition information of the mobile device 120 from the mobile device 120. And, when a position of the mobile device 120 is shifted (or relocated) to a distance from the first, second, and third areas 411, 412, and 413 to the fourth, fifth, and sixth areas 414, 415, and 416 along the direction from the first, second, and third areas 411, 412, and 413 to the fourth, fifth, and sixth areas 414, 415, and 416, or when a relocation time of the mobile device 120 coincides with a time point at which the drag motion is inputted, the content device 110 may determine that the mobile device 120 was held in the user's hand 300, and the content device 110 may then recognize the determined result as a touch input for performing content transfer.

Figure 5:
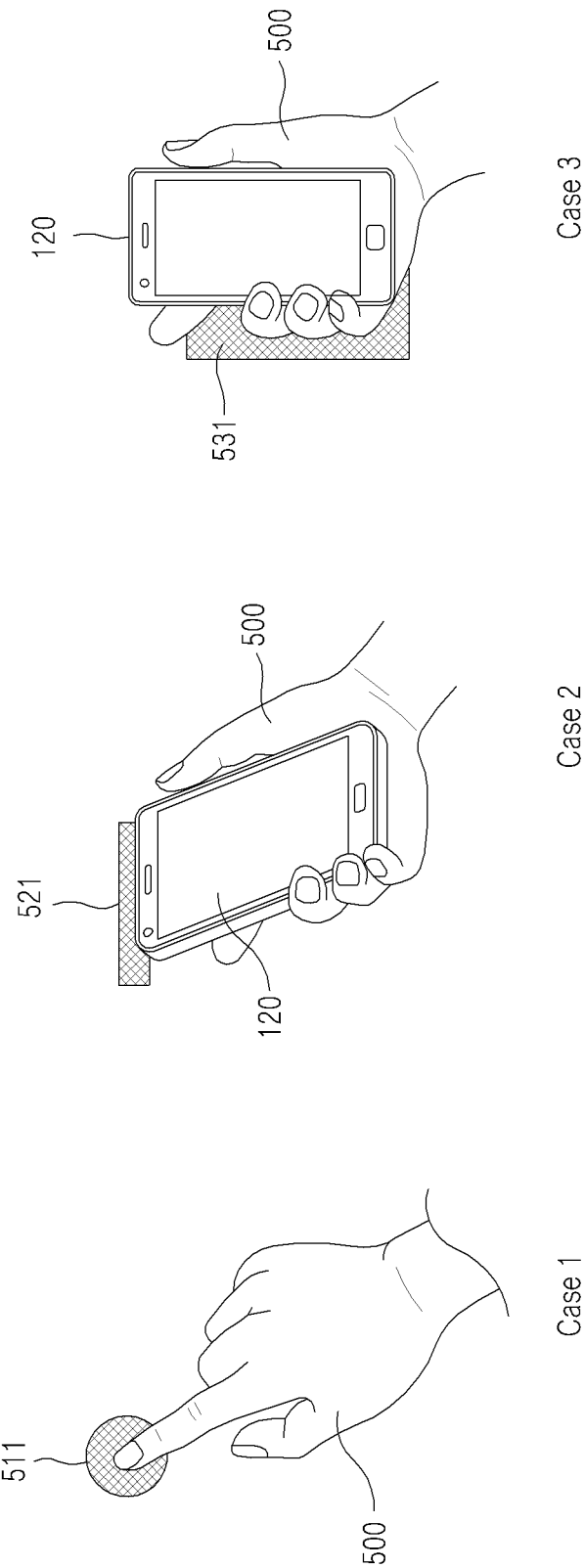

FIG. 5 illustrates exemplary forms of an unusual touch, which is inputted as a touch input for performing content transfer.

Among diverse touch types being identified (or recognized) by the content device, an unusual touch (or unique touch) may correspond to a form of touch that cannot be easily realized by using a general finger.

For example, an unusual touch may correspond to a touch motion touching a display of the content device with the mobile device 120 or a touch motion touching the display with knuckles of the hand 500 holding (or grabbing) the mobile device 120.

More specifically, when a general touch performed by using the user's fingers is inputted, a form of a touch trace 511, which is detected by the content device, may consist of a circular form, as shown in Case 1 of FIG. 5.

Conversely, when an unusual touch performed by the mobile device 120 is inputted, a form of a touch trace 521, which is detected by the content device, may consist of a rectangular form or an oval form having a length corresponding to a width of the mobile device 120, as shown in Case 2 of FIG. 5.

Additionally, when an unusual touch performed by a knuckle or joint of the user's hand 500 is inputted, a form of a touch trace 531, which is detected by the content device, may consist of a rectangular form having a length corresponding to a width of the back of the user's hand 500, or the user's finger, as shown in Case 3 of FIG. 5.

Accordingly, based upon the form (or shape) of the touch trace, the content device may identify whether the object inputting the input command corresponds to the user's finger, the mobile device 120, or a knuckle or joint of the hand 500 holding the mobile device 120. And, in case the input object corresponds to the mobile device 120, or a knuckle or joint of the hand 500 holding the mobile device 120, the content device 110 may identify the touch type of the input object has an unusual touch. At this point, the form (or shape) of the touch trace may correspond to a form (or shape) of the object touching the display, as shown in FIG. 5. More specifically, when an unusual touch is inputted to the content device, the content device may identify the inputted unusual touch as a touch input for performing content transfer.

Figure 6:
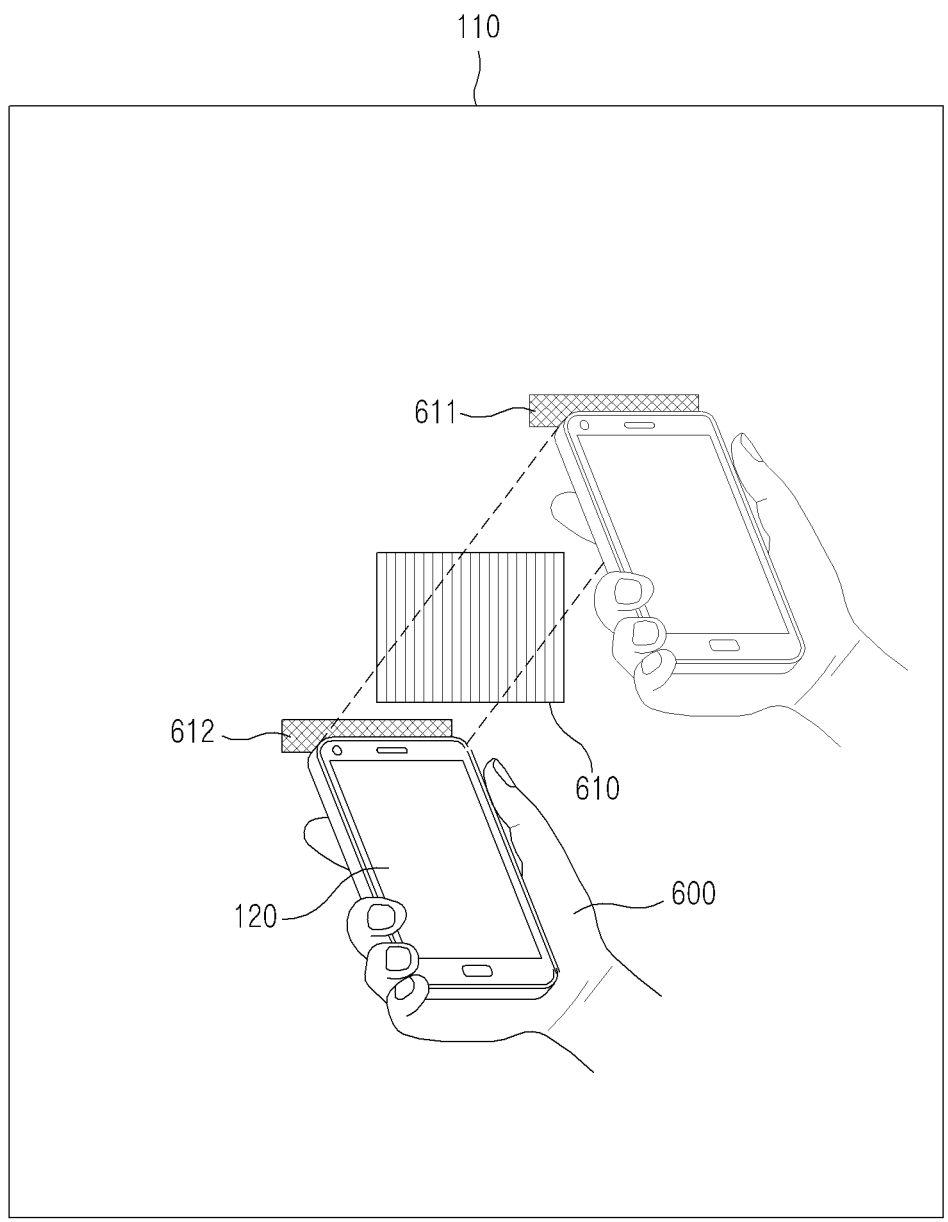

FIG. 6 illustrates yet another exemplary touch input for performing content transfer according to an exemplary embodiment of the present invention.

As shown in FIG. 6, when the user performs a dragging motion with the mobile device 120 from a first area 611 of the display to a second area 612, while touching the first area 611 within the mobile device 120, the content device 110 determines that a touch input selecting content, which is to be transferred, has been performed by using an unusual touch. And, accordingly, the content device may establish coupling with the mobile device 120. At this point, since the shape (or form) of the object touching the first area 611 is different from the shape (or form) of a general touch, which is inputted by the user's finger, the content device 110 may determine than an unusual touch has been inputted.

Subsequently, after searching for a content 610 that is displayed between the first area 611 and the second area 612, the content device 110 may identify the searched content 610 as the content selected by the user for being transferred to the mobile device 120.

Figure 7:
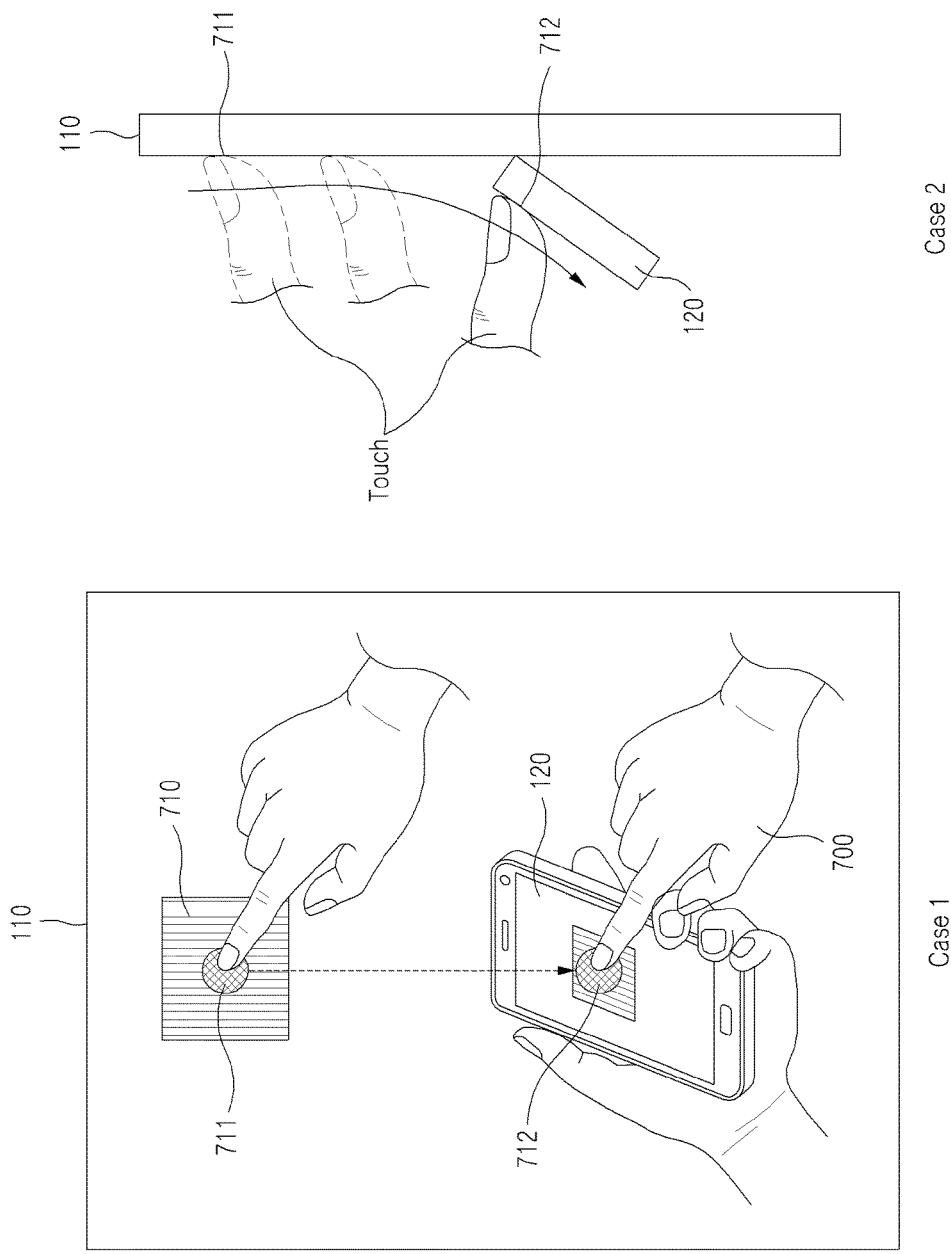

FIG. 7 illustrates yet another exemplary touch input for performing content transfer according to an exemplary embodiment of the present invention.

The content device 110 according to the exemplary embodiment of the present invention may transfer content by using both unusual touch and general touch.

Case 1 of FIG. 7 illustrates a front view of a case when content is transferred by using both unusual touch and general touch, and Case 2 of FIG. 7 illustrates a side view of the same corresponding case.

More specifically, as shown in FIG. 7, the user may touch a portion of the display of the content device 110 by using the mobile device 120. Thereafter, the user may use another hand 700 to touch a first area 711 of the content 710 he (or she) wishes to transfer. Subsequently, as shown in Case 2 of FIG. 7, the user may drag the hand 700 touching the first area 711 and move his (or her) finger to a second area 712 of the display of the mobile device 120.

Accordingly, when the content device 110 consecutively recognizes an unusual touch, which is occurred (or generated) by having the user touch the display of the content device 110 with the mobile device 120, and a general touch dragging the content 710, the content device 110 may determine the recognized unusual touch and general touch as touch input for transferring content.

Afterwards, when a touch down time, which is most approximate to a time point at which a touch up motion has occurred on the display of the content device 110, coincides with a response time performed by the mobile device 120, the content device 110 may establish coupling with the mobile device 120.

Figure 8:
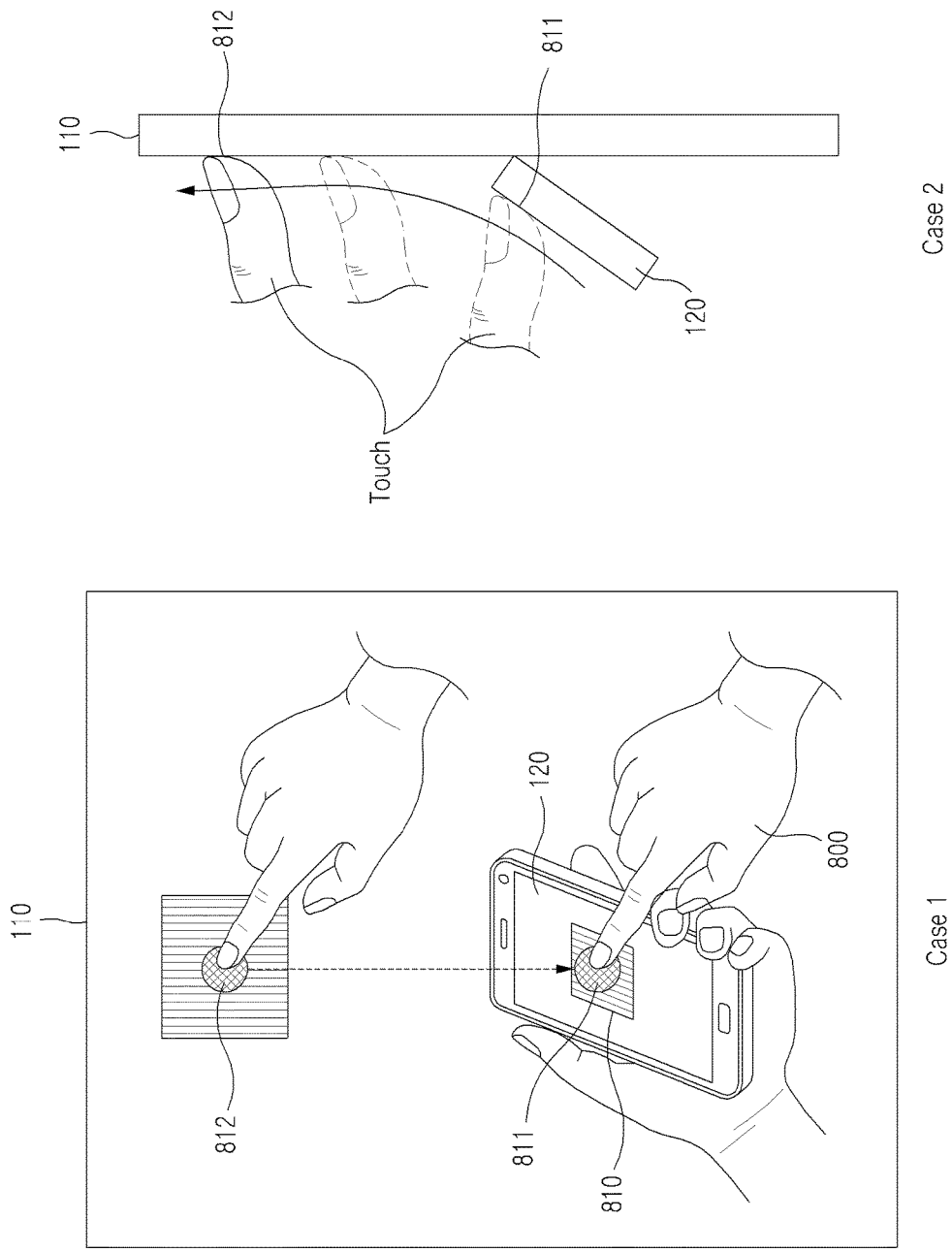

Conversely, in case the mobile device 120 wishes to transfer content to the content device 110, as shown in FIG. 8, after touching a portion of the display of the content device 110 with the user's mobile device 120, which is held by one hand of the user, the user may touch a first area 811 of a content 810 that is displayed on the mobile device 120 with the other hand 800. Thereafter, the user may drag the hand 800 touching the first area 811 and move to a second area 812 within the display of the content device 110.

Similarly, when the content device 110 consecutively recognizes an unusual touch, which is occurred (or generated) by having the user touch the display of the content device 110 with the mobile device 120, and a general touch dragging the content 810, the content device 110 may determine the recognized unusual touch and general touch as touch input for transferring content from the mobile device 120 to the content device 110.

Although the above-described touch formats can be applied as user input for requesting content transfer, these are merely exemplary. And, therefore, the touch formats may be diversely varied.

First Embodiment

Figure 9:
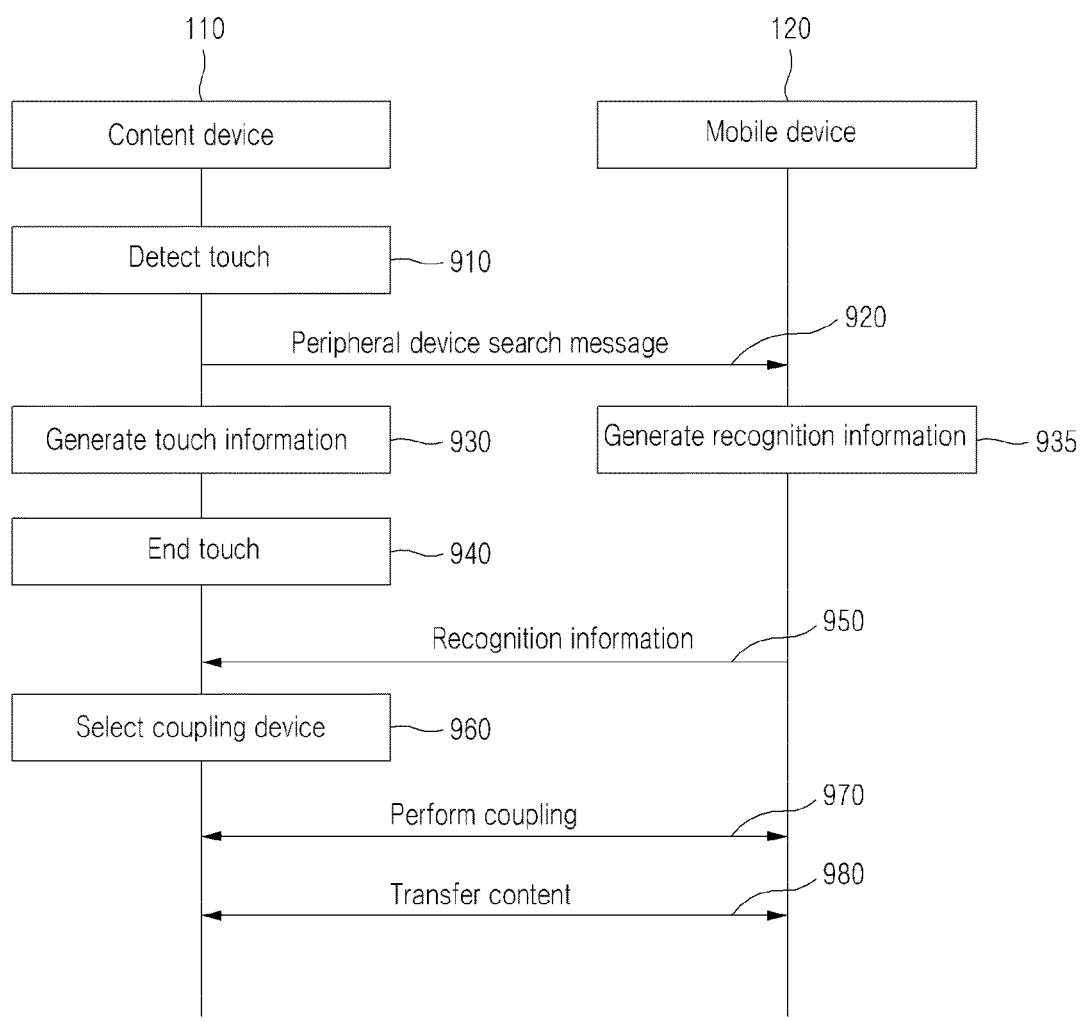

FIG. 9 illustrates an exemplary method for transferring content according to the present invention.

In step (910), the coupling controller of the content device 110 may detect an object touching the display of the content device 110.

In step (920), when the object touching the display of the content device 110 is detected, or when a start time of the dragging motion of the object touching the display is detected in step (910), the coupling controller of the content device 110 may transmit a peripheral device search message.

In step (930), the coupling controller of the content device 110 may generate (or create) touch information respective to the object detected in step (910). More specifically, the coupling controller may identify a touch type of the object, which is detected in step (910), based upon a number of detected objects, a surface area of the detected object, and a shape of the detected object. Additionally, the coupling controller may identify a touch command, which is inputted to the content device 110 by the user by using an object, based upon a movement pattern of the detected object. Thereafter, the coupling controller may generate touch information of the detected object, wherein the touch information includes a touch command and a touch type of the detected object.

In step (935), when the coupling controller of the mobile device 120 receives the peripheral device search message in step (920), the coupling controller of the mobile device 120 may generate recognition information including at least one of a change in an accelerometer of the mobile device 120, a location of the mobile device 120, a movement distance of the mobile device 120, and a movement pattern of the mobile device 120.

In step (940), the coupling controller of the content device 110 may detect completion of the touch of the object touching the display in step (910).

In step (950), the coupling controller of the mobile device 120 may provide the content device 110 with the recognition information, which is generated in step (935). More specifically, the coupling controller of the mobile device 120 may generate a response message respective to the peripheral device search message, which is received in step (920), by using the recognition information generated in step (935) and identification information of the mobile device 120. Thereafter, the coupling controller of the mobile device 120 may transmit the response message to the content device 110.

In step (960), the coupling controller of the content device 110 may compare information on spatial movement time, spatial movement distance, and spatial movement patterns of the mobile device 120, which are included in the recognition information of the response message that is received in step (950), with movement time, movement distance, and movement patterns of a touch, which are included in the touch information that is generated in step (930). Thereafter, based upon the compared result, if the recognition information and the touch information are identical within a predetermined error range, the coupling controller of the content device 110 may select the mobile device, which has transmitted the response message, as the device that is to be coupled with the content device 110.

In step (970), the coupling controller of the content device 110 may perform coupling with the mobile device 120, which is selected in step (960) by using the identification information of the mobile device 120 that is included in the response message received in step (950).

In step (980), the content transfer unit of the content device 110 may transfer the content within the content device 110 to the mobile device 120 based upon the touch information, which is generated in step (930), or the content transfer unit of the content device 110 may display the content received from the mobile device 120.

Figure 10:
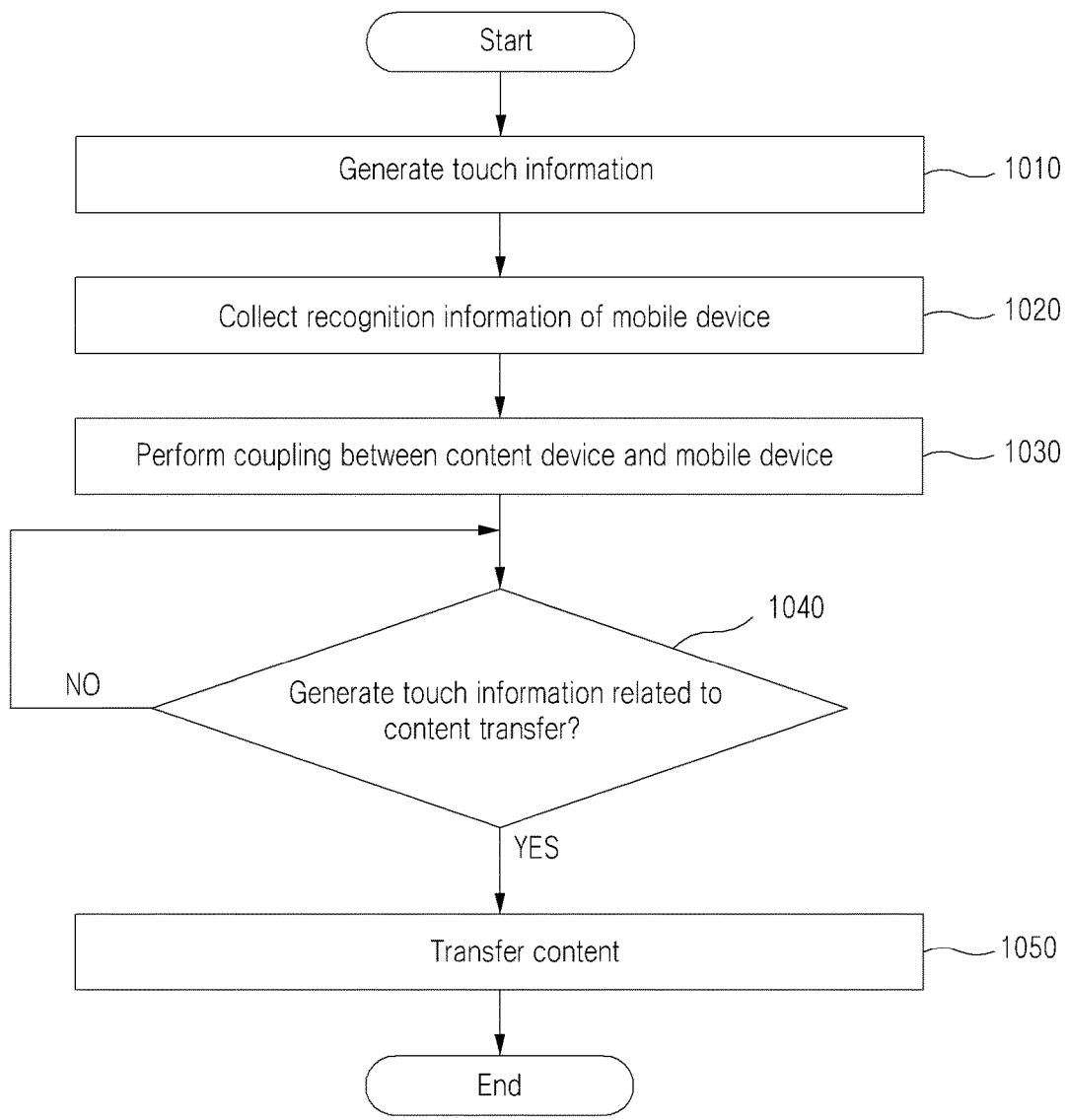

FIG. 10 illustrates a flow chart showing an operating method of the content device.

In step (1010), the coupling controller may identify a touch type of an object based upon a number, surface area, and a shape of the objects touching the display of the content device 110. Additionally, the coupling controller may identify a touch command being inputted to the content device 110 by the user by using an object based upon a movement pattern of the corresponding object. Moreover, the coupling controller may generate touch information including the touch command and a touch type of the corresponding object.

At this point, the coupling controller may identify the touch type as any one of a single touch, which consist of one of the user's fingers inputting a command by touching the display, a multi touch, which consists of multiple fingers of the user inputting a command by touching multiple locations (or location points) on the display, and an unusual touch, which consists of the mobile device 120 or the hand of the user grabbing (or holding) the mobile device 120 inputting a command by touching the display.

In step (1020), the coupling controller may collect recognition information of the mobile device 120, which is located near the content device 110. More specifically, when step (1010) is performed due to the presence of an object touching the display of the content device 110 or due to a movement (or gesture) starting a dragging motion of the object touching the display, the coupling controller may transmit a peripheral device search message. At this point, in case the coupling controller receives a response message respective to the transmitted peripheral device search message, the coupling controller may extract and collect recognition information of the mobile device 120, which is located near the content device 110, from the received response message.

In step (1030), the coupling controller may perform coupling with the mobile device 120 based upon the touch information of the touching object, which is generated in step (1010), and the recognition information of the mobile device 120, which is collected in step (1020). The coupling method will hereinafter be described in more detail with reference to FIG. 11.

In step (1040), the content transfer unit may verify whether or not the touch information corresponds to the touch information related to content transfer. At this point, the touch information that is verified by the content transfer unit may correspond to the touch information generated in step (1010) or to the touch information generated by the coupling controller in real-time in accordance with the touch of the touching object after performing step (1010). In case the touch information generated in step (1010) does not correspond to the touch information related to content transfer, the content transfer unit may be on stand-by (or wait) until touch information related to content transfer is generated.

In step (1050), the content transfer unit may transfer content to the mobile device 120, which is coupled to the content device 110 in step (1030), based upon touch information of the object that is verified to be related to content transfer in step (1040), and also based upon the recognition information that is collected in step (1020). The method for transferring content will hereinafter be described in more detail with reference to FIG. 12.

Figure 11:
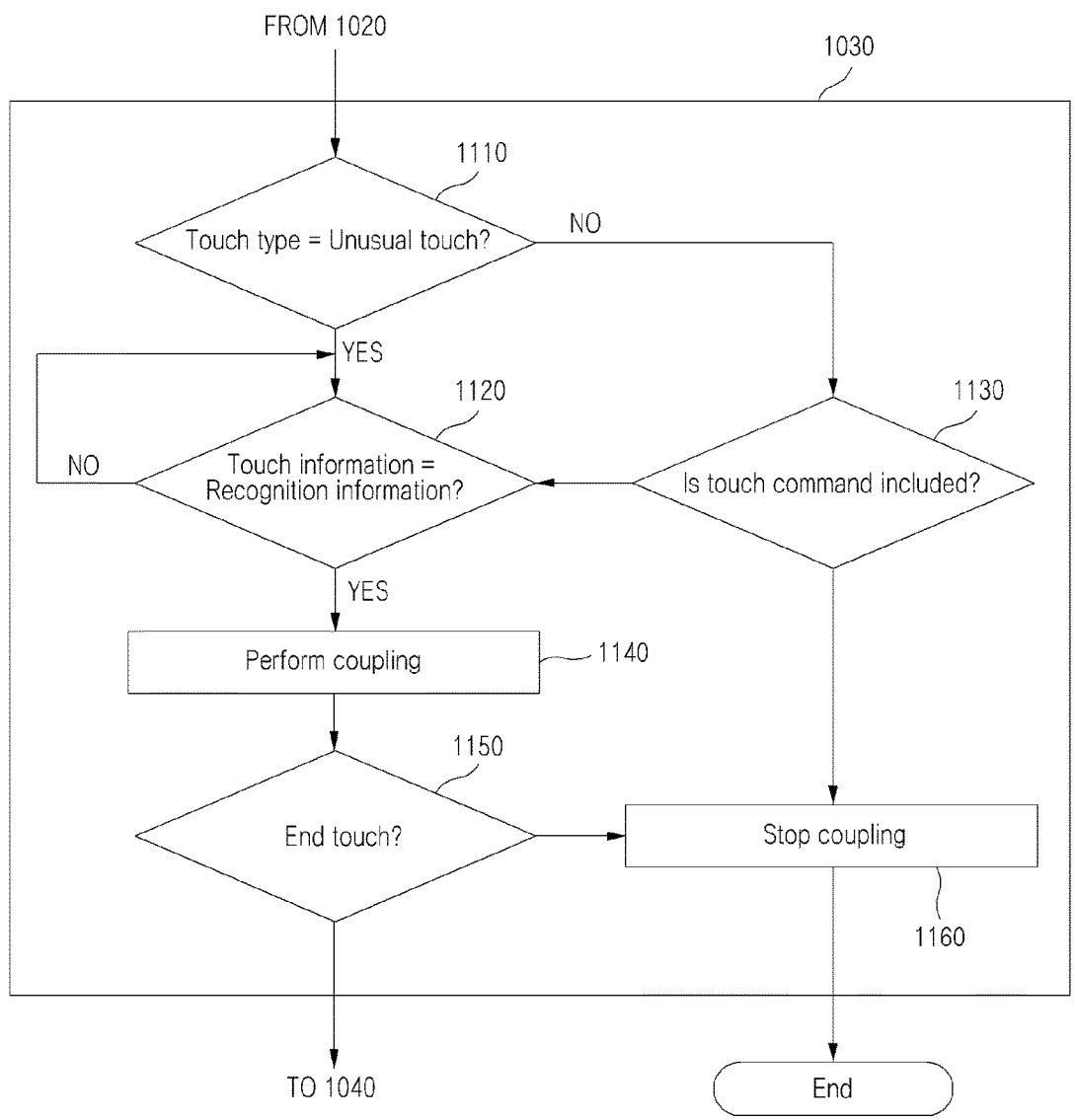

FIG. 11 illustrates a flow chart showing a coupling procedure of step (1030).

In step (1110), the coupling controller may verify whether or not the touch type, which is included in the touch information of the object that is generated in step (1010), corresponds to an unusual touch. In case the touch type corresponds to an unusual touch, the coupling controller may perform step (1120), and, in case the touch type corresponds to a single touch or a multi touch instead of the unusual touch, the coupling controller may perform step (1130).

In step (1120), the coupling controller may verify whether or not the touch information of the object, which is generated in step (1010), is identical to the recognition information of the mobile device 120 that is collected in step (1020). More specifically, if the movement time, movement distance, and movement patterns of the mobile device 120, which are included in the recognition information, match with (or are identical to) movement time, movement distance, and movement patterns of an object, which are included in the touch information, within a predetermined error range, the coupling controller may determine that the recognition information and the touch input are identical.

In case the recognition information and the touch input are identical, the coupling controller may perform step (1140), and, in case the recognition information and the touch input are not identical, the corresponding mobile device 120 cannot be coupled with the content device 110.

In step (1130), the coupling controller may verify whether or not a touch command is included in the touch information, wherein the touch type has been verified as a single touch or a multi touch in step (1110). If a touch command is included in the touch information, the coupling controller may perform step (1120), so as to determine whether or not coupling may be performed with the mobile device 120. Additionally, if a touch command is not included in the touch information, this indicates that the user has simply touched the display and has ended the touch motion without any movement (i.e., without moving the device). And, therefore, this may indicate that the user has touched the display only to execute the corresponding content and that the user does not wish to transfer the corresponding content.

In step (1140), the coupling controller may perform coupling with the mobile device 120, which has collected recognition information in step (1020).

In step (1150), the coupling controller may determine whether or not the object touching the display in step (1010) has ended the touch motion. More specifically, in case a touch up time is included in the touch information, and when the current time corresponds to the touch up time (or time of the touch up motion), the coupling controller may determine that the touch motion is ended. And, when the touch motion is ended, the coupling controller may perform step (1160).

Additionally, when the touch motion is not ended, the coupling controller may maintain the coupled state, which is established in step (1140).

In step (1160), the coupling controller may stop the coupled state, which is established in step (1140), and may then end the method for transferring content.

Figure 12:
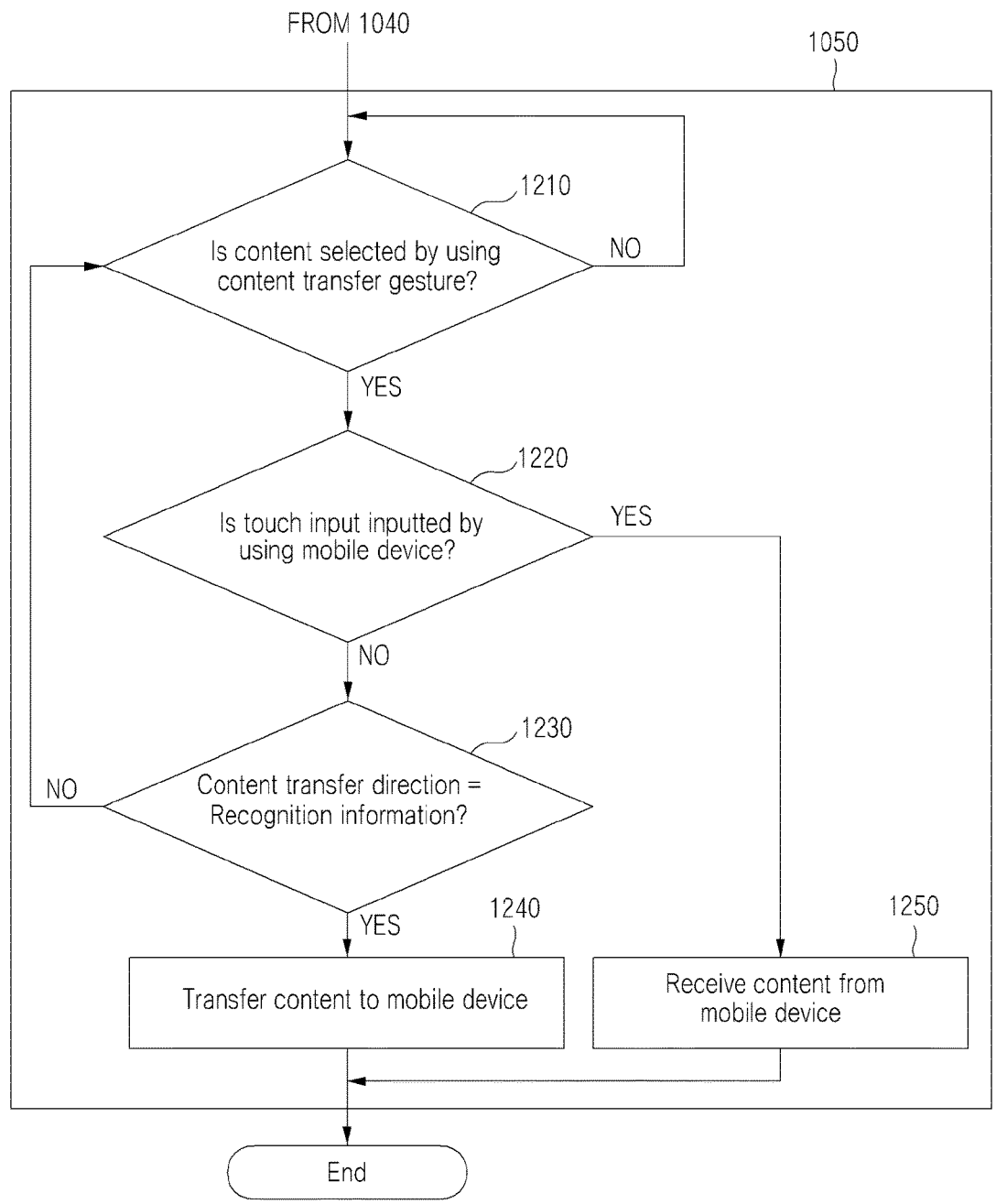

FIG. 12 illustrates a flow chart showing a content transfer procedure of step (1050).

In step (1210), the content transfer unit may verify whether or not the user has selected a content with a content transfer gesture. At this point, a content transfer gesture may correspond to any one of a gesture inputting any one of touch command, such as a single touch or at least one touch command, such as dragging, sweeping, and flicking, as a multi touch, a gesture using an unusual touch, and a gesture performing an unusual touch and a general touch at the same time.

In case the user has selected the content by using the content transfer gesture, the content transfer unit may perform step (1220), so as to determine whether to transfer the content to the mobile device 120 or whether to receive the content from the mobile device 120.

In case the user has not selected the content by using the content transfer gesture, this may indicate that the user does not wish to transfer the content. And, therefore, the content transfer unit may remain in a stand-by mode (or waiting mode) while repeating step (1210) until the user selects a content by using the content transfer gesture.

In step (1220), the content transfer unit may verify whether or not the mobile device 120 has received a touch input. More specifically, among the contents displayed on the display of the mobile device 120, when at least one of the contents is selected by the user, the mobile device 120 may transmit content information on the content, which is selected by the user, to the content device 110. Thereafter, when the content information is received from the mobile device 120, the content transfer unit may verify that the mobile device 120 has received a touch input. Additionally, when the mobile device 120 receives a touch input, since the content of the mobile device 120 is required to be transferred to the content device 110, the content transfer unit may perform step (1250). Alternatively, when the mobile device 120 does not receive a touch input, since the content of the content device 110 is required to be transferred to the mobile device 120, the content transfer unit may perform step (1230).

In step (1230), the content transfer unit may verify whether or not a transfer direction of the content, which is performed in accordance with the touch command, corresponds to the recognition information. For example, when a content is transferred downward in accordance with a touch command, and when the recognition information received from the mobile device 120 corresponds to information being transferred downward, the content transfer unit may determine that the transfer direction of the transferred content corresponds to the recognition information. Additionally, while the mobile device 120 is touching the display of the content device 110, when the transfer direction of the content corresponds to a transfer direction that is directed toward a position of an unusual touch, which is performed by the mobile device 120, the content transfer unit may determine that the transfer direction of the content corresponds to the recognition information. Additionally, in case the transfer direction of the content does not correspond to the recognition information, this may indicate that the user wishes to transfer (or relocate) the content only within the range of the display of the content device 110, the content transfer unit may repeat step (1210) and be in a stand-by mode until the content transfer gesture is inputted.

In step (1240), the content transfer unit may transfer content that is selected in step (1210) to the mobile device 120, which is coupled to the content device 110.

In step (1250), the content transfer unit may receive the content that is selected in step (1220) from the mobile device 120, which is coupled to the content device 110. And, the content transfer unit may display the received content at a location point where the gesture is inputted in step (1210).

Figure 13:
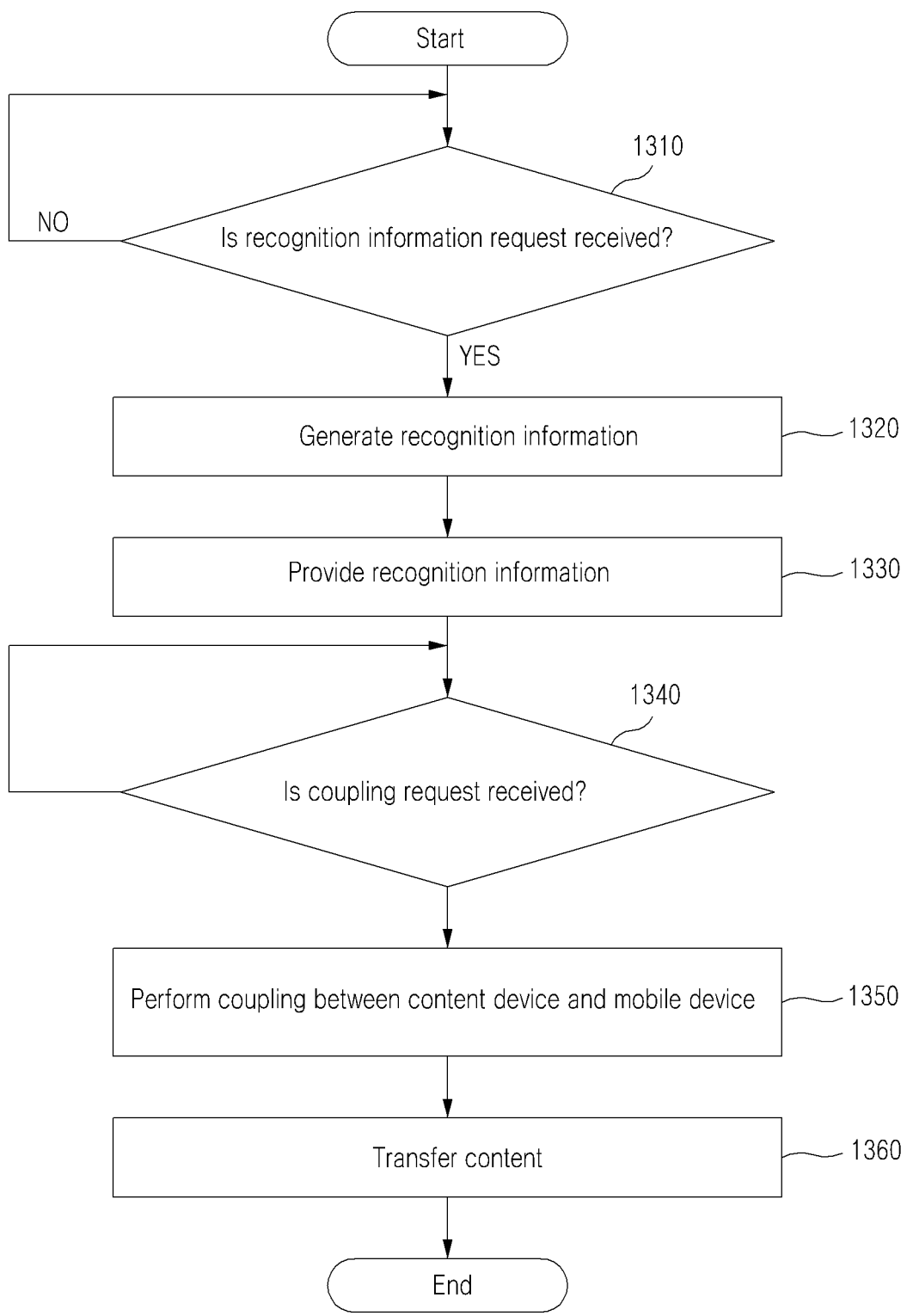

FIG. 13 illustrates a flow chart showing an operating method of the mobile device.

In step (1310), the coupling controller may verify whether or not a peripheral device search message is received from the content device 110. Then, if the peripheral device search message is not received, the coupling controller may remain in a stand-by mode while repeating step (1310) until the peripheral device search message is received from the content device 110.

In step (1320), the coupling controller may generate recognition information including at least one of a change in an accelerometer of the mobile device 120, a position of the mobile device 120, a movement distance of the mobile device 120, and a movement pattern of the mobile device 120.

In step (1330), the coupling controller may provide the recognition information, which is generated in step (1320), to the content device 110. More specifically, the coupling controller may generate a response message respective to the peripheral device search message by using the recognition information and the identification information of the mobile device 120. Thereafter, the coupling controller may transmit the generated response message to the content device 110.

In step (1340), the coupling controller may verify whether or not a coupling request is received from the control device 110. Then, when the coupling request is not received, the coupling controller may remain in a stand-by mode while repeating step (1340) until the coupling request is received.

In step (1350), the coupling controller may perform coupling between the content device 110, which has transmitted the coupling request, and the mobile device 120.

In step (1360), the content transfer unit may receive at least one content from the content device 110, and the content transfer unit may display the received content on the display of the mobile device 120. Additionally, when the user selects the content, which is displayed on the display of the mobile device 120, and when a touch command is inputted to the content device 110, the content transfer unit may transmit the content, which is selected by the user, to the content device 110.

Second Embodiment

In the present invention, even if a collection of recognition information through accelerometer information acquisition of the mobile device is not performed, coupling between the content device and the mobile device may be performed.

Hereinafter, a method for transferring content by using touch and image code recognition in a content device according to another exemplary embodiment will be described in detail.

When generating touch information, instead of collecting recognition information of a mobile device, the content device may convert a content located at a position where the user has performed (or inputted) a touch motion to an image code and may acquire information on whether or not this conversion has been recognized by the mobile device. Accordingly, by performing coupling with the mobile device to which the corresponding gesture is performed, the content device may perform content transfer.

After identifying a touch type of an object based upon a number, surface area, and a shape of the objects touching the display of the content device, the coupling controller of the content device may generate touch information of the object and may output a control signal based upon the identified touch type of the touching object. Thereafter, in accordance with the control signal, which is based upon the identified touch type of the object, the coupling controller may transmit a peripheral device search message for verifying whether or not a mobile device exists within a predetermined distance range. Then, the coupling controller may convert a content existing at a location where the touch of the object was detected in accordance with the control signal, which is based upon the identified touch type of the object, so that an image code can be displayed on an image conversion area, which corresponds to at least a portion of an area (or a partial area) where contents are being displayed. At this point, the image code may correspond to a display form repeatedly or alternately displaying at least one color in accordance with a specific time interval or pattern, or the image code may correspond to a form of displaying an image, which is configured of a barcode or a QR code. Accordingly, after receiving a peripheral device search message from the content device, the mobile device may recognize an image code, which is displayed on the display of the content device, by using a means that is capable of recognizing an image code. Thereafter, the mobile device may load the recognized image code in a response message respective to the peripheral device search message and may transmit the response message to the content device. At this point, the mobile device may recognize the image code being displayed on the content device by using an illuminance sensor, a camera, an RGB sensor, an image sensor, and so on.

The coupling controller may perform coupling with the mobile device based upon the touch information of the object, which includes the touch type of the object, and the response message, which is received from the content device. In other words, when the image code being converted in accordance with the control signal, which is based upon the touch type of the object, is identical to the image code being recognized by the mobile device, which has transmitted the response message, within a predetermined error range, the coupling controller may perform coupling with the corresponding mobile device.

A method for transferring content by using touch and image code recognition will hereinafter be described in detail with reference to FIG. 14 and FIG. 15.

Figure 14:
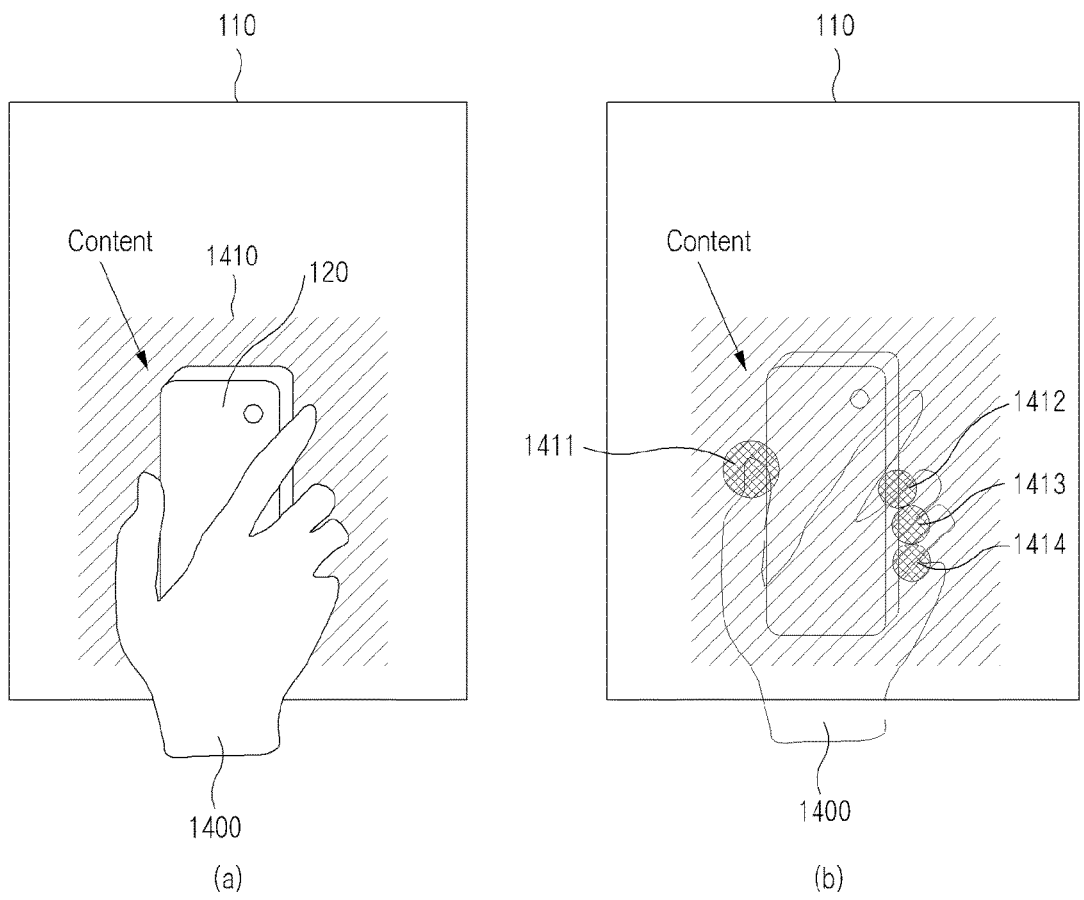
Figure 15:
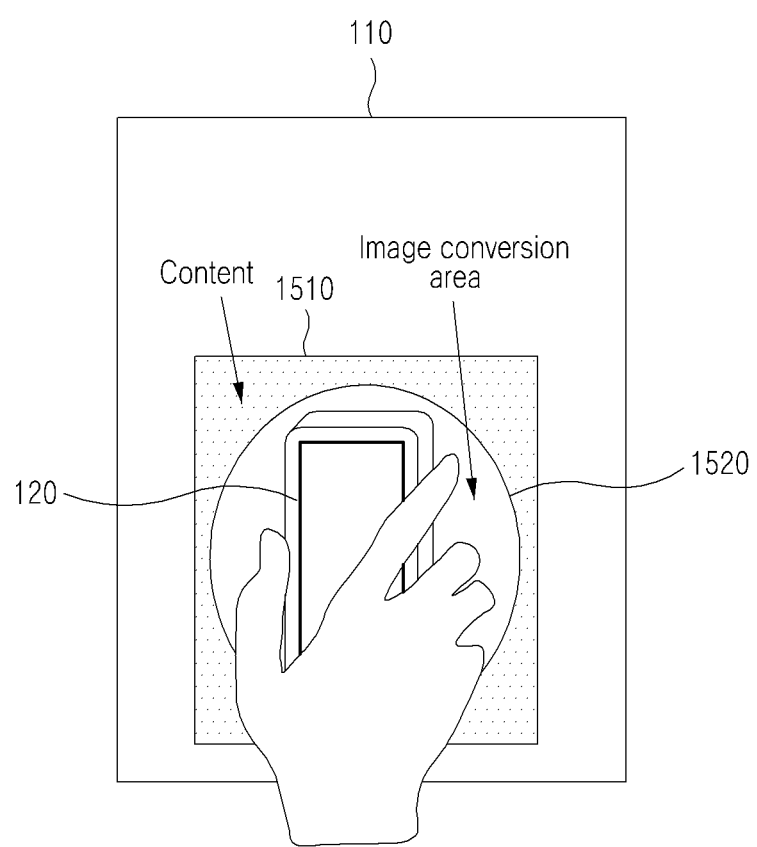

As shown in (a) of FIG. 14, the user may grab (or hold) the mobile device 120 with his (or her) hand 1400, so that a display of the mobile device 120 can face into a display of the content device 110, and, then, the user may touch a position (or location point) of a content 1410 displayed on the content device 110. This may correspond to a touch situation when the user directly contacts the mobile device 120 to the display of the content device 110. And, additionally, this may also correspond to a touch situation when the user closely positions the display of the mobile device 120, so that the display of the mobile device 120 can face into the display of the content device 110, while the user's hand 1400 is located between the mobile device 120 and the content device 110, so that the user's hand 1400 that is holding the mobile device 120 can easily touch one or more areas 1411 to 1414 on the display of the content device 110, as shown in (b) of FIG. 14.

At this point, after recognizing coordinates corresponding to the performed touch motion, the content device 110 may convert an image code respective to the content 1410 existing within the corresponding coordinates, and may transmit a peripheral device search message in order to verify whether or not a mobile device 120 exists within a predetermined distance range.

After receiving the peripheral device search message from the content device 110, the mobile device 120 may detect whether or not a content displayed on the display of content device 110, which is facing into the display of the corresponding mobile device 120, is converted to an image code. And, at this point, if the image code conversion is detected, the mobile device 120 transmits a response message to the content device 110 as a response to the received peripheral device search message. After receiving the response message respective to the peripheral device search message, the content device 110 performs coupling with the mobile device 120, which has transmitted the response message.

A process of the mobile device for performing image code conversion on a content being displayed on the content device will hereinafter be described in detail.

For example, referring to FIG. 15, when the content device 110 has identified a touch, the content device 110 may transmit a peripheral device search message, and, then, the content device 110 may repeatedly display an alternation of white and black colors two times at a time interval of 0.5 second (e.g., white-black-white-black) throughout at least a partial area 1520 (hereinafter referred to as an 'image conversion area') of the content 1510, which is located at a position where the identified touch has been performed. Accordingly, after receiving the peripheral device search message, the mobile device 120 measures an illuminance level by using an illuminance sensor, which is located at a front surface of the mobile device 120. At this point, since an image code consisting of an alternation of black and white is displayed on the image conversion area 1520 of the content 1510, which is displayed on the content device 110 that is facing into the front surface of the mobile device 120, the mobile device 120 may obtain a sensor measurement result value based upon a bright-dark-bright-dark display respective to the corresponding image code by using the illuminance sensor. After measuring the illuminance sensor value for a predetermined period of time, the mobile device 120 may load the measured illuminance sensor value to a response message respective to the peripheral device search message and may then transmit the corresponding response message to the content device 110. After receiving the response message respective to the peripheral device search message, when variation values in the illuminance sensor value, which is included in the response message, and a respective time intervals are identical to (or match with) an order of brightness and time of the colors displayed in the image conversion area 1520 of the content within a predetermined error range, the content device 110 performs coupling with the mobile device 120 that has transmitted the response message.

In the above-described method, by adjusting the color that is to be displayed and a time of display in the image conversion area 1520, the content device 110 may transmit a pre-decided specific code to the mobile device 120, and the mobile device 120 may perform coupling with the content device 110 by recovering a code, which is transmitted by the content device 110, using the illuminance sensor value.

At this point, the coupling controller of the mobile device may receive a peripheral device search message from the content device, and, when the peripheral device search message is received, the coupling controller of the mobile device activates a module that is required for recognizing an image code, which is displayed on the content device, and, then, the coupling controller may recognize the image code that is displayed on the content device by using an illuminance sensor, a camera, an RGB sensor, an image sensor, and so on.

The coupling controller of the mobile device may generate a response message respective to the peripheral device search message by using the identification information of the corresponding mobile device and may load the recognized measurement result value to the generated response message and may transmit the processed response message to the content device.

When the code recognition value included in the response message, which is transmitted from the mobile device, is identical to the image code converted by the content device, the content device may transmit a coupling request to the corresponding mobile device. And, accordingly, the coupling controller of the mobile device may perform coupling with the content device, which has transmitted the coupling request.

Figure 16:
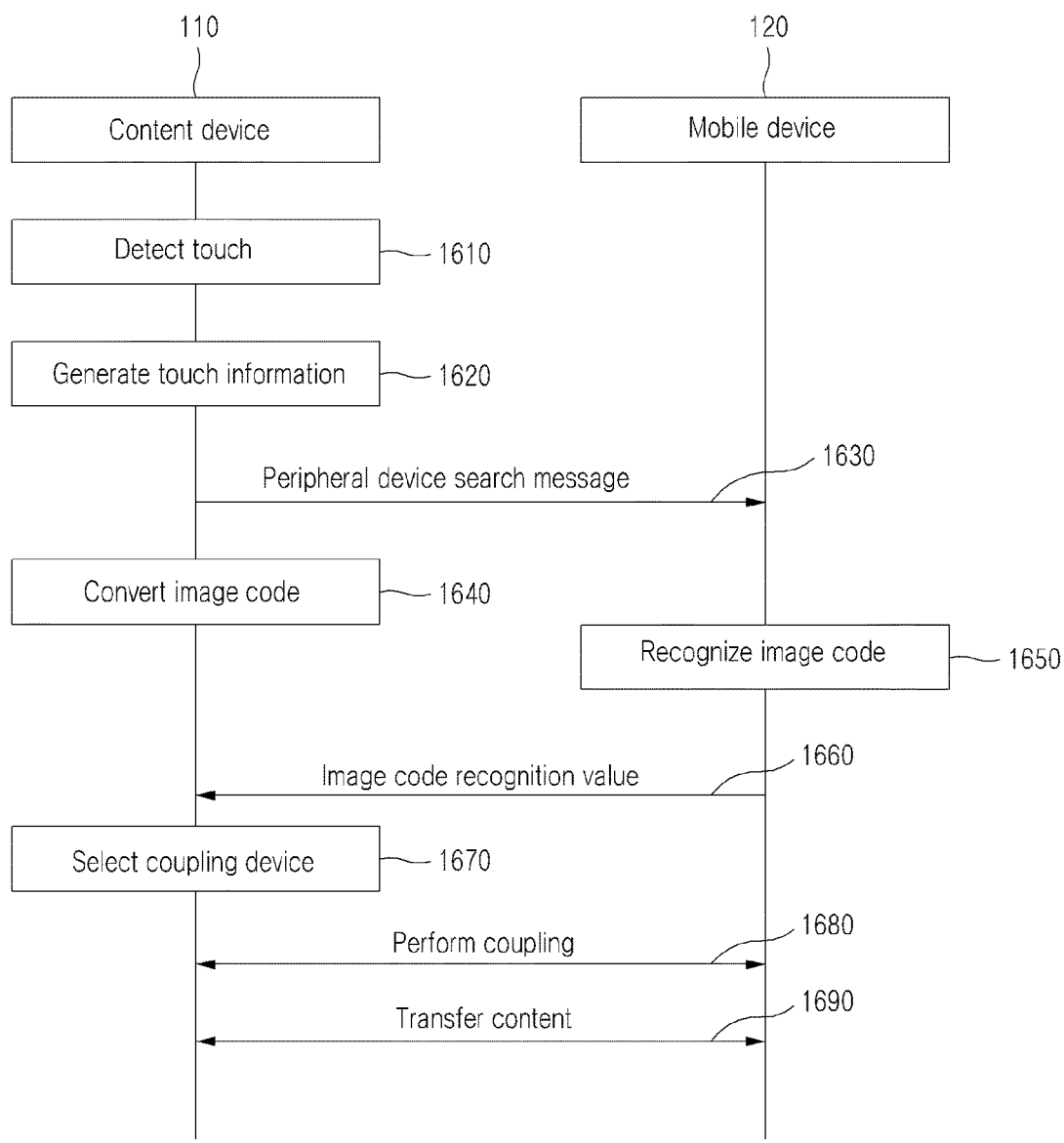

FIG. 16 illustrates another exemplary method for transferring content according to the present invention.

In step (1610), the content device 110 may detect an object touching the display of the content device 110.

In step (1620), the content device 110 may identify a touch type of an object based upon a number, surface area, and a shape of the objects detected in step (1610), and, then, the content device 110 may generate touch information of the object including the touch command and a touch type of the object.

In step (1630), in case the object touching the display of the content device 110 is detected in step (1610), the content device 110 may transmit a peripheral device search message for verifying whether or not a mobile device 120 exists within a predetermined distance range.

In step (1640), in case the object touching the display of the content device 110 is detected in step (1610), the content device 110 converts a content existing in a position where the touch of the object has been detected to an image code, and, then, the content device 110 may display an image code in an image conversion area, which corresponds to at least a portion of the area where the respective content is displayed.

In step (1650), after receiving the peripheral device search message from the content device 110, the mobile device 120 may activate a module, which is required for recognizing the image code that is displayed on the content device 110. Thereafter, the content device 110 may recognize the image code by using the corresponding module.

In step (1660), the mobile device 120 may generate a response message respective to the peripheral device search message by using its own identification information. Thereafter, the mobile device 120 may load the code recognition value, which is recognized in step (1650), in the response message and may transmit the processed response message to the content device 110.

In step (1670), the content device 110 compares the code recognition value, which is included in the response message transmitted by the mobile device 120, with the image code, which is converted in step (1640). Then, based upon the compared result, when it is determined that the two code information are identical to one another within a predetermined error range, the content device 110 may select the mobile device 120, which has transmitted the response message, as the mobile device that is to be coupled with the content device 110.

In step (1680), the content device 110 may perform coupling with the mobile device 120, which is selected in step (1670), by using identification information of the mobile device 120, which is included in the response message transmitted from the mobile device 120.

In step (1690), based upon the touch information generated in step (1620), the content device 110 may transfer the content to the mobile device 120, or the content device 110 may display the content received from the mobile device 120 on the display of the content device 110.

In case of applying the above-described method for recognizing image code conversion, when the content device 110 has simultaneously identified touches in multiple positions (or location points), by assigning a different code value to each touch position and by expressing the image conversion area with a specific color, in case multiple mobile devices 120 simultaneously perform interaction for content transfer, each of the mobile devices 120 may be differentiated from one another.

As a method of the mobile device 120 for recognizing image code conversion respective to a content within the content device 110, a method of using an illuminance sensor has been mentioned above. However, the mobile device 120 may also perform the same functions by using a camera, RGB sensor, image sensor, and so on.

Additionally, in the method for performing coupling via image code recognition, coupling and content transfer may be performed via image conversion recognition when a single touch is performed as well as when a multi touch or an unusual touch is performed. This also applies to when the user generates a touch having a shape (or form) different from the shape of a general touch, such as a touch, that leaves a touch trace corresponding to a combination of an unusual touch and a multi touch, and so on.

In the above-described method for recognizing image conversion, an image code is described to have a predetermined area of the content (i.e., image conversion area) expressed in white or black. However, the method may also be performed to express an image code by temporarily increasing or decreasing a brightness level of the corresponding content to "Very Bright" or "Very Dark", or by temporarily inverting the display of the corresponding content. Additionally, a specific image (e.g., barcode, QR code, and so on) including information on the corresponding content may be temporarily displayed. And, by having a camera recognize such expression, a method of transferring a wanted code from the content device to the mobile device may be performed.

Furthermore, in the above-described exemplary embodiment, although an output of the image code is described to be displayed on the display of the content device, as another example, the image code may be outputted in the form of a consistent pattern (e.g., being turned on, off, on, and off at intervals of 0.5 second) by using a camera flash, which is equipped in the content device. And, thereafter, the mobile device 120 may recognize the outputted pattern of the image code by using an illuminance sensor, a camera, an RGB sensor, an image sensor, and so on.

Third Embodiment

In the present invention, coupling between a mobile device and a content device may be performed by using a proximity sensor of the mobile device.

Hereinafter, according to yet another exemplary embodiment of the present invention, a method of transferring content via touch and proximity sensor recognition from the content device will be described in detail.

In FIG. 17, step (1710) shows an example of accessing (or approaching) the mobile device 120, which is held by the user's hand, to the content device 110, and step (1720) shows an example of a proximity sensor included in the mobile device 120, which is capable of recognizing an access (or approach) of the content device 110 in accordance with the access motion performed in step (1710).

It is described in this exemplary embodiment that, by using both touch and proximity sensor recognition, coupling between a content device 110 and a mobile device 120 may be performed even if accelerometer information or position information of the mobile device 120 is not collected.

As shown in FIG. 17, the user may touch (or contact) the content within the content device 110 by using the user's hand, which is holding (or grabbing) the mobile device 120.

In this case, the proximity sensor of the mobile device 120 may recognize that an object is accessing (or approaching) the mobile device 120. For example, generally, the proximity sensor may return a sensor value of 0, when there is no object existing within a 5 to 8 centimeter radius, and the proximity sensor may return a sensor value of 1, when there is an object existing within a 5 to 8 centimeter radius. At this point, in accordance with the access of the object, the sensor value of the proximity sensor may vary from 0 to 1, and the mobile device 120 may store a time point at which such sensor value is varied as a first time of change.

In accordance with the above-described user touch (touch down motion), the content device 110 may recognize coordinates of a position (or location point) where the touch is performed and may store a time of recognition of the recognized touch. Thereafter, the content device 110 may broadcast a message for performing coupling (search message) to peripheral (or neighboring) devices in accordance with the touch recognition.

When a touch is cancelled by the user, the content device 110 may recognize the cancellation of the touch (touch up motion) and may store a time of cancellation at which the touch is cancelled.

At this point, the mobile device 120 may recognize that the access of the object has been cancelled through the proximity sensor in accordance with the cancellation of the access. According to the above-described example, in case the access of the object is canceled, the sensor value of the proximity sensor may change from 1 to 0. In this case, the mobile device 120 may store a second time of change at which the sensor value changes.

Each of the mobile devices having the sensor value of its proximity sensor changed may transmit a response message respective to the peripheral device search message in order to perform coupling with the content device 110. In this case, each of the response message transmitted by the mobile devices may include a first time of change and a second time of change, which are respectively stored by each mobile device.

The content device 110 may receive a response message from the peripheral (or neighboring) mobile devices. Thereafter, the content device 110 may compare the time of recognition, time of cancellation, first time of change, and second time of change of each touch and may then perform coupling with the mobile device having the most closely matching time. If only one mobile device 120 has transmitted the response message, the content device 110 may compare the time of recognition and the time of cancellation of the touch with the first time of change and the second time of change included in the response message, which is received from the mobile device 120, so as to decide whether or not to perform coupling with the corresponding mobile device.

Figure 18:
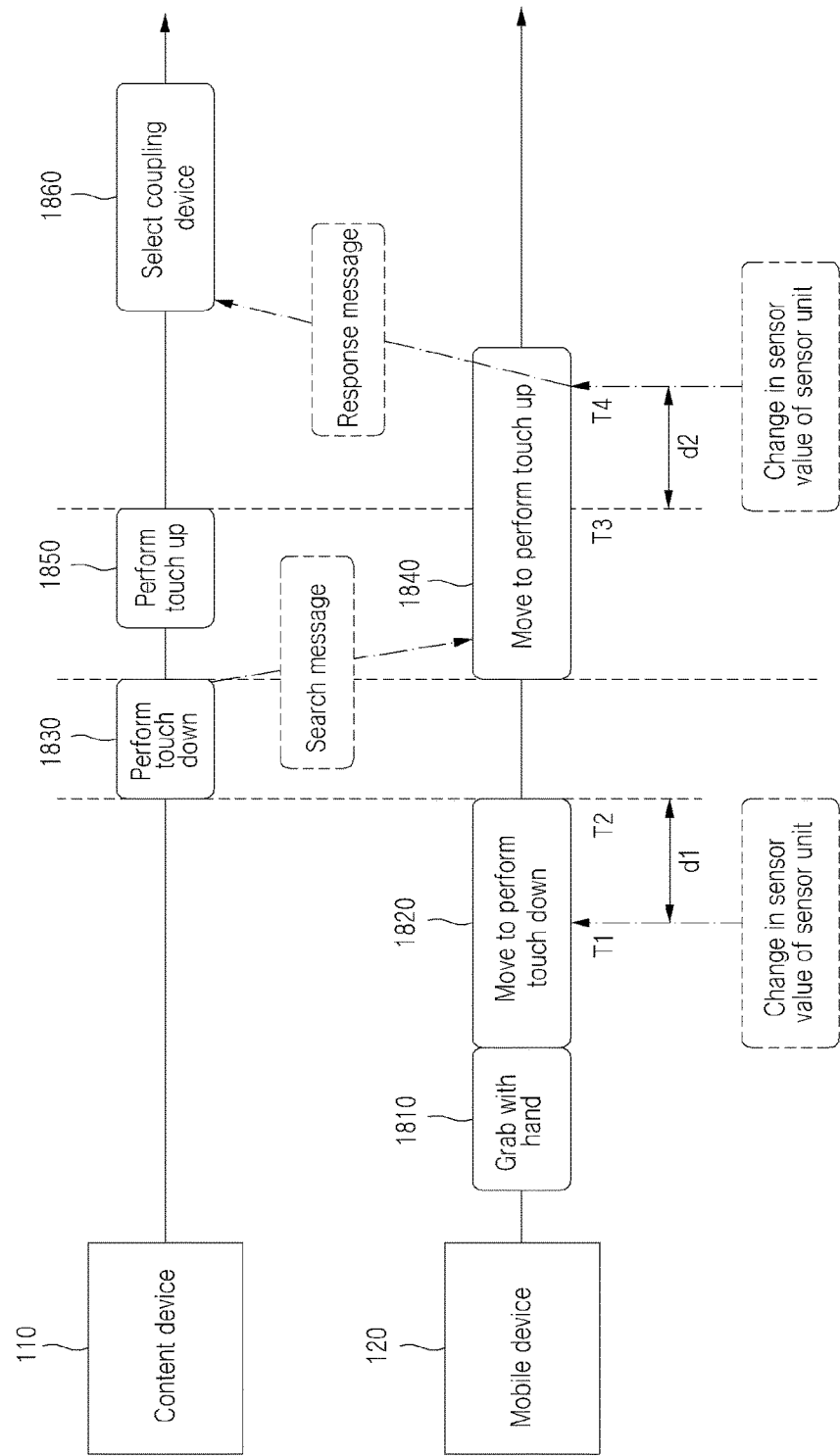

FIG. 18 illustrates a flow chart showing a content transferring process performed by touch and proximity sensor recognition.

In step (1810), the user may grab (or hold) the mobile device 120 with his (or her) hand.

In step (1820), the user may move the mobile device 120 toward the content device 110 in order to perform a touch down motion. At this point, as the mobile device 120 accesses (or approaches) the content device 110, the sensor value of the proximity sensor included in the mobile device 120 may change from 0 to 1. In this case, the mobile device 120 may store the first time of change T1.

In step (1830), the content device 110 may recognize the touch down motion. At this point, the content device 110 may store the time of recognition at which the touch down motion is recognized. And, then, the content device 110 may broadcast a search message, which corresponds to a message for performing coupling.

In step (1840), the user may move the mobile device 120, so that the mobile device 120 can be positioned further away from the content device 110 in order to perform a touch up motion.

In step (1850), the content device 110 may recognize the touch up motion. At this point, the content device 110 may store a time of cancellation T3 at which the touch up motion is recognized. Additionally, in accordance with the movement of the mobile device 120 for the touch up motion, the sensor value of the proximity sensor included in the mobile device 120 may change from 1 to 0. In this case, the mobile device 120 may store the second time of change T4. Additionally, as a response to the above-described search message, the mobile device 120 may transmit a response message to the content device 110. At this point, the response message may include the first time of change T1 and the second time of change T4.

In step (1860), the content device 110 may select a coupling device. At this point, the coupling device may be selected by using the first time of change T1, the time of recognition T2, the time of cancellation T3, and the second time of change T4.

For example, the content device 110 may first verify a first condition respective to whether or not the first time of change T1 correspond to a time prior to the time of recognition T2 and a second condition respective to whether or not the time of cancellation T3 corresponds to a time prior to the second time of change T4. Since the time of recognition T1 always corresponds to a time prior to the time of cancellation T3, by using the first condition and the second condition, the content device 110 may verify whether or not the mobile device 120, which has transmitted the response message, corresponds to a mobile device that is adequate to perform coupling. In case multiple mobile devices satisfying both first condition and second condition exist, the content device 110 may select the mobile device for performing coupling by using a difference value d1 between the time of recognition T2 and the first time of change T1 and a difference value d2 between the second time of change T4 and the time of cancellation T3. For example, the content device 110 may select a mobile device having the smallest d1 and d2 values in order to perform coupling.

When coupling between the content device 110 and the mobile device 120 is completed, the content may be transferred to and from one another. At this point, the content that is to be transferred may be decided by using a pre-defined method.

For example, if the content existing in a position (or location point), where the user has touched the content device, corresponds to the content that is to be transferred from the content device 110 to the mobile device 120, the corresponding content may be transferred from the content device 110 to the mobile device 120. Additionally, if the content existing in a position (or location point), where the user has touched the content device, corresponds to the content that is to be transferred from the mobile device 120 to the content device 110, the content displayed on the display screen of the mobile device 120 may be transferred to the content device 110 and may then be moved to the location point within the content device 110 where the user has touched.

In another example, when the user is holding the mobile device 120, and when the user touches the content device while touching the display screen of the mobile device 120 with the finger, e.g., thumb or index, of the hand holding (or grabbing) the mobile device 120, the content displayed on the screen of the mobile device 120 is transferred to the content device 110, and the transferred content may move to a position (or location point) within the display of the content device 110 where the user has touched. Additionally, when the user touches the content device 110 without touching the screen of the mobile device 120, the content located in a position (or location point) on the display of the content device 110, where the user has touched, may be transferred from the content device 110 to the mobile device 120.

In the above-described examples, the location point (or position) within the content device 110 where the user has touched may include a point (or location point) that is touched for the coupling process or a point (or location point) that the user has newly touched after the coupling process.

Figure 19:
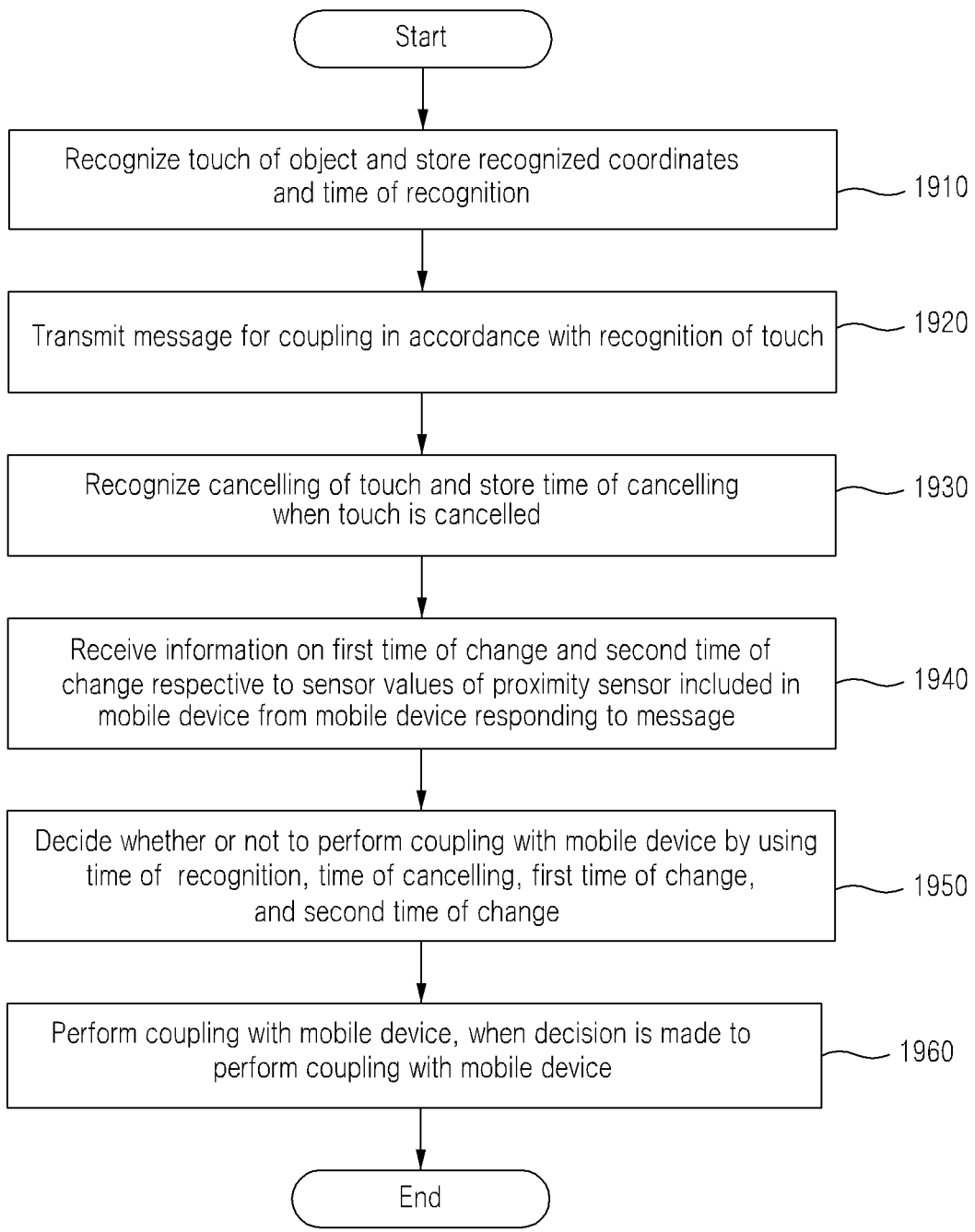

FIG. 19 illustrates a flow chart showing a method for transferring content from the content device. The method for transferring content according to the present invention may be performed by the content device 110.

In step (1910), the content device 110 may recognize the touch of an object and may store coordinates of a point where the touch is recognized and a time of recognition. In this case, the coordinates and the time of recognition may be stored in at least one of the above-described storage unit.

In step (1920), the content device 110 may transmit a message for the coupling process in accordance with a touch recognition. At this point, the message for the coupling process may correspond to the above-described search message, and the search message may be broadcasted to neighboring (or peripheral) devices.

In step (1930), the content device 110 may recognize a touch cancellation and may store a time of cancellation at which the touch has been cancelled. At this point, the time of cancellation may be stored in at least one of the above-described storage units.

In step (1940), the content device 110 may receive information on a first time of change and a second time of change respective to a sensor value of the proximity sensor, which is included in the mobile device, from the mobile device responding to the received message. Herein, the first time of change may include a time at which the proximity sensor recognizes access of a specific object, and the second time of change may include a time at which proximity sensor recognizes cancellation of the access of the specific object. For example, the specific object may include the content device 110.

In step (1950), the content device 110 may decide whether or not to perform coupling with a mobile device by using a time of recognition, a time of cancellation, a first time of change, and a second time of change. At this point, as determined in step (1950), based upon whether or not the first time of change corresponds to a time prior to the time of recognition and whether or not the second time of change corresponds to a time after the time of cancellation, the content device 110 may determine whether or not to perform coupling with the mobile device. In step (1950), if multiple mobile devices have transmitted a response respective to the message, among the mobile devices that have transmitted information on the first time of change, which corresponds to a time prior to the time of recognition, and information on the second time of change, which corresponds to a time after the time of cancellation, the content device 110 may select the mobile device having the smallest difference value between the time of recognition and the first time of change and the smallest difference value between the second time of change and the time of recognition as the mobile device that is to be coupled with the content device 110.

In step (1960), in case the content device 110 has decided to perform coupling with the decided mobile device, the content device 110 may perform coupling with the corresponding mobile device.

Additionally, whenever required, the method for transferring content may optionally further include a step of transmitting and receiving (or transceiving) content to and from its coupled mobile device by using at least one of stored coordinates, coordinates of a newly recognized touch, a touch recognized by the coupled mobile device, and coordinates of the touch recognized by the coupled mobile device.

Figure 20:
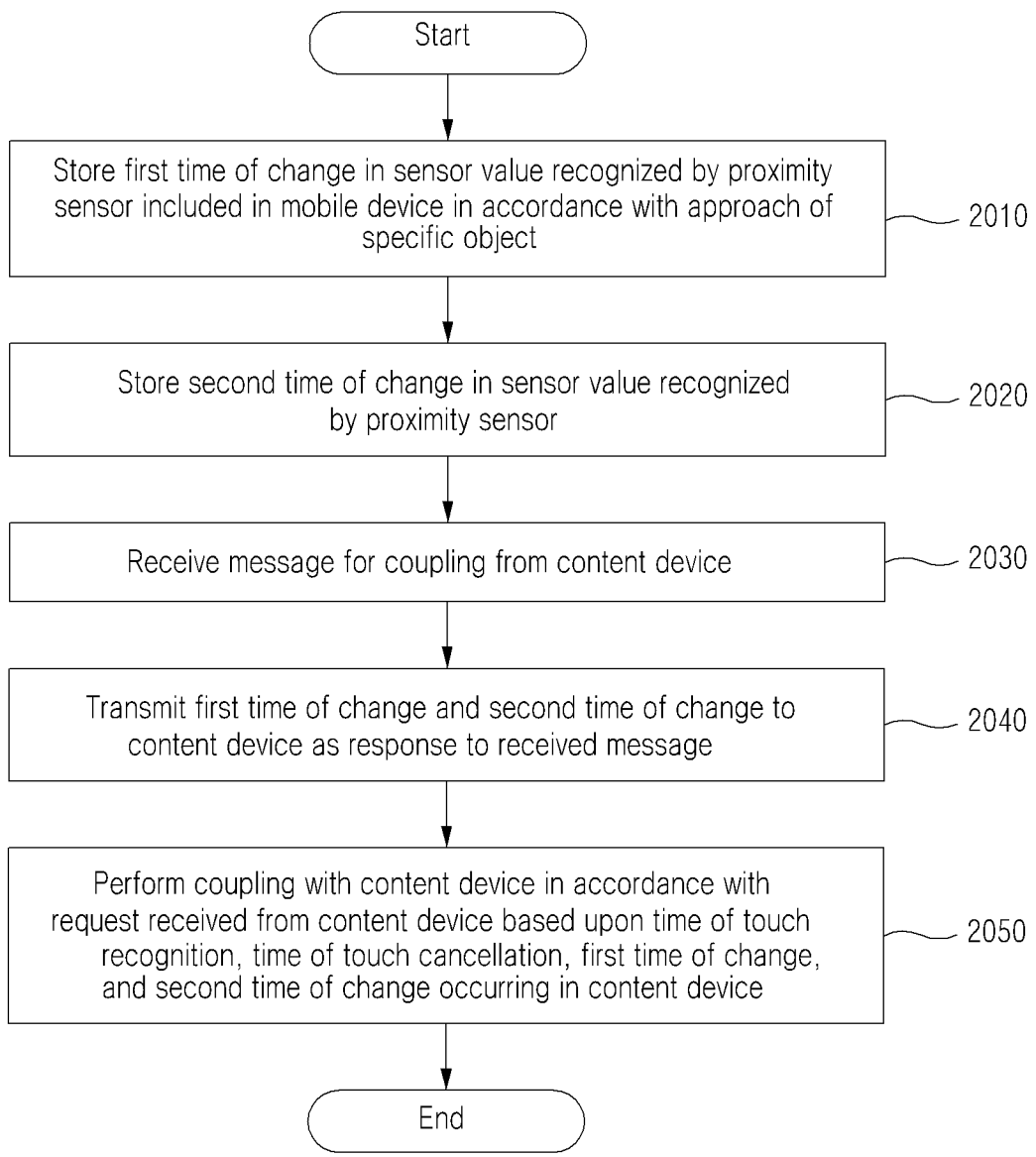

FIG. 20 illustrates a flow chart showing a method for transferring content from the mobile device. The method for transferring content according to this exemplary embodiment of the present invention may be performed by the mobile device 120 (or coupling controller of the mobile device 120).

In step (2010), the mobile device 120 may store a first time of change of a sensor value, which is recognized by the proximity sensor included in the mobile device in accordance with an approach (or access) of a specific object. For example, the first time of change may be stored in at least one storage unit included in the mobile device 120.

In step (2020), the mobile device 120 may store a second time of change of a sensor value, which is recognized by the proximity sensor in accordance with a cancellation of the approach (or access) of the specific object.

In step (2030), the mobile device 120 may receive a message for the coupling process from the content device 110.

In step (2040), as a response to the message, the mobile device 120 may transmit the first time of change and the second time of change to the content device 110.

In step (2050), the mobile device 120 may perform coupling with the content device 110 in accordance with a request, which is received from the content device based upon the time of touch recognition, the time of touch cancellation, the first time of change, and the second time of change, which are generated in the content device 110.

The present invention may perform coupling between the mobile device and the content device by using a proximity sensor of the mobile device.

Fourth Embodiment

In the present invention, coupling between a mobile device and a content device may be performed by using a photo sensor of the content device and a proximity sensor of the mobile device.

In this exemplary embodiment, the content device 110 may be configured as a display having a photo sensor equipped therein, and the mobile device 120 may be configured to have a proximity sensor for transmitting an image to the photo sensor of the content device 110 equipped therein. At this point, the proximity sensor has different status values for a case when an object accesses a range within approximately 5 centimeters (cm), and a case when there is no object accessing the range or when an object exists outside of the range.

Figure 21:
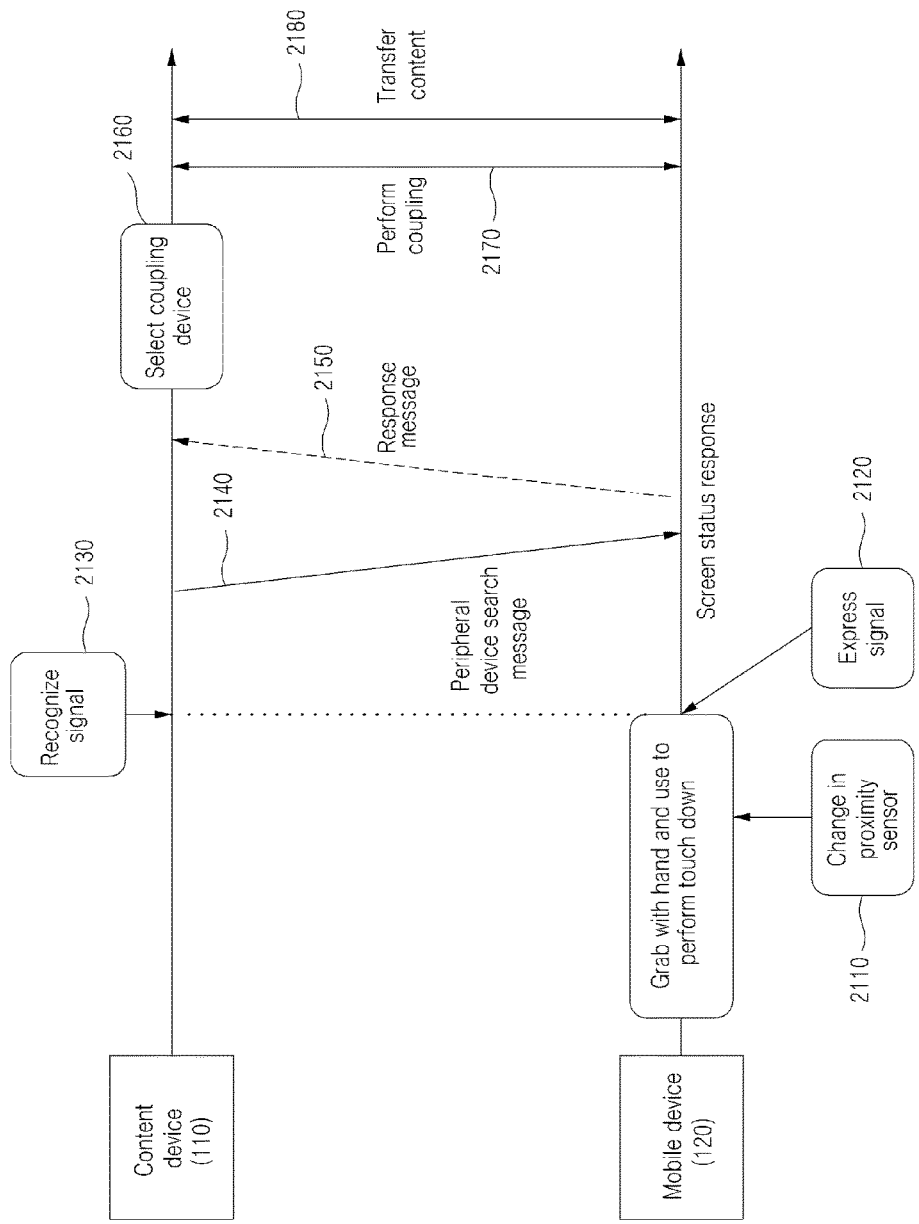

FIG. 21 illustrates a method for transferring content between the content device and the mobile device by using a photo sensor of the content device and a proximity sensor of the mobile device.

In step (2110), when the user brings (or accesses) the mobile device 120 near the content device 110, the mobile device 120 may recognize the display of the content device 110, which has closely accessed (or approached) the proximity sensor, as the accessing object, and the status value of the proximity value may change in accordance with the object recognition result.

In step (2120), when the status value of the proximity sensor changes, the coupling controller of the mobile device changes the display screen by using diverse means that can be transmitted in the form of a signal, such as a still image having a specific shape (or form), blinking, moving image, and so on.

In step (2130), the content device 110 may recognize the changed screen of the mobile device 120 as a pre-decided signal by using the photo sensor, which is equipped in the display.

In step (2140), the coupling controller of the content device 110 may deliver a peripheral device search message. At this point, when delivering the peripheral device search message, the content device 110 may also transmit signal status information respective to a type of the received signal (blinking, still image, moving image, and so on).

In step (2150), when the peripheral device search message is received from the content device 110, the coupling controller of the mobile device 120 may include information on the changed screen status information, which is changed in step (2120), in a response message and may transmit the processed response message to the content device 110. As another example, the coupling controller of the mobile device 120 may compare signal status information, which is included in the peripheral device search message, and information on a screen status, which is changed in step (2120). Thereafter, only when the two sets of information are identical to one another, the coupling controller of the mobile device 120 may transmit the response message to the content device 110.

In step (2160), after receiving the response message from all of the mobile devices located in near the content device 110, among the mobile devices 120 that have transmitted the response message, the coupling controller of the content device 110 may select a mobile device 120 having a screen status that is identical to a signal status of the signal received by the content device 110.

In step (2170), the coupling controller of the content device 110 may perform coupling with the mobile device 120, which is selected in step (2160).

In step (2180), a content transfer unit of the content device 110 may transmit content to the mobile device 120, wherein the transmitted (or transferred) content corresponds to a location point that is touched by an unusual touch or content displayed on an area where the photo sensor of the content device 110, which has recognized a change in the screen of the mobile device, exists.

In the above-described method, instead of directly contacting the mobile device 120 to the content device 110, even if the mobile device 120 has approached (or accessed) the content device 110, if the access of the mobile device 120 is within a range of 5 cm to the content device 110, the proximity sensor may be operated (or activated). And, since a screen change is attempted at this point, even if the mobile device 120 is not directly contacted/touched, the content transfer may be performed.

The method for transferring content according to the present invention relates to performing coupling and content transfer between two devices based upon an access of the content device 110 by using a proximity sensor of the mobile device 120 and a screen change recognition of the mobile device 120 by using a photo sensor of the content device 110.

Fifth Embodiment

In the recent mobile devices, a finger hovering technology (e.g., 'Air View' of Samsung Galaxy S4) is applied. Herein, the finger hovering technology allows the user to execute a specific function by moving his (or her) hand over the screen of the mobile device without having to directly touch the display screen of the mobile device. The finger hovering technology refers to a technology allowing the mobile device to recognize the user's finger, when the user's finger accesses an approximately 0.1 to 3 cm range of the display screen of the mobile device, and to perform a pre-decided operation based upon the recognized result. This is generally applied to a case of using a capacitive touch screen. When the user's finger has approached near the touch screen, the hovering technology may detect a change in the electrostatic capacity (or capacitance) at a location point within the touchscreen where the user's finger is located and may then recognize the close access of the user's finger.

In the present invention, the content transfer may be performed between the content device and the mobile device by using a touch and hovering technology.

Figure 22:
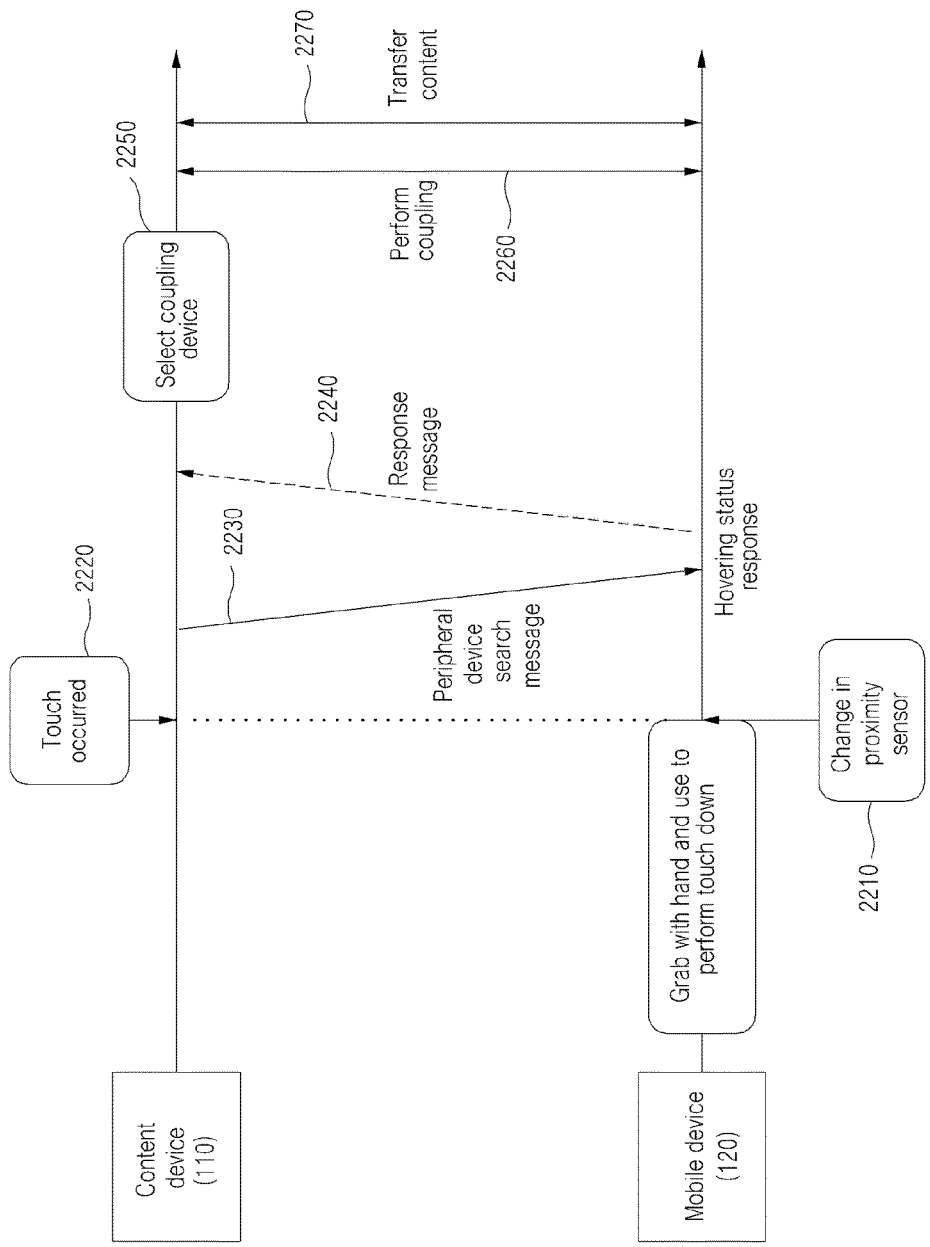

FIG. 22 illustrates a method for transferring content by using a touch and hovering technology In step (2210), a hovering input is generated in the mobile device 120, when the user grabs (or holds) the mobile device 120 with his (or her) hand and performs a touch towards the content device 110.

In step (2220), a single touch or multi touch input is generated in the content device 110 by a finger of the user's hand holding the mobile device 120.

In step (2230), when a touch input is generated, the coupling controller of the content device 110 transmits a peripheral device search message to the mobile device 120.

In step (2240), after receiving the peripheral device search message from the content device 110, the coupling controller of the mobile device 120 may include its own hovering status in the response message and may, then, transmit the processed response message to the content device 110. At this point, the mobile device 120 may be in a state of receiving a hovering input through the entire touchscreen, and the mobile device 120 may recognize such input as an unusual hovering input. This is because, since the mobile device 120 and the content device 110 are facing into one another, the display of the content device 110 performs a hovering input on the entire touchscreen of the mobile device 120.

In step (2250), the coupling controller of the content device 110 may receive a response message from all of the mobile devices 120 located near the content device 110, and, among the mobile devices 120 that have transmitted the response message, the coupling controller of the content device 110 may select a mobile device 120 having a hovering input (i.e., unusual hovering input) performed on the entire screen.

In step (2260), the coupling controller of the content device 110 may perform coupling with the mobile device 120, which is selected in step (2250).

In step (2270), the content transfer unit of the content device 110 may transfer the content, which is located at a position (or location point) where the unusual touch is performed, to the mobile device 120. At this point, by having the content device 110 transmit content existing at coordinates where the touch input is performed, among the content displayed on the content device 110, the user may be capable of experiencing an effect of downloading a wanted content to his (or her) mobile device 120 by touching the wanted content with the hand that is holding (or grabbing) the mobile device 120.

The method for transferring content according to the present invention may perform coupling and content transfer by using a hovering input between the content device and the mobile device.

Hereinafter, a method for transferring content using a non-touch based coupling method will be described in detail.

Sixth Embodiment

In the present invention, coupling between the mobile device and the content device may be performed by using an infrared ray code.

In this exemplary embodiment of the present invention, the mobile device may be configured to include a camera as a means for acquiring an optical signal pattern, which is outputted from the content device. Additionally, in the content device, an optical radiation device corresponding to any one of an infrared ray (IR) emitter, an ultraviolet (UV) emitter, and a visible ray emitter may be placed in a main body of the device or on a border area (or boundary area) of the display, and, when the user captures (or records or takes a picture of) the content device by using the camera of the mobile device, the optical radiation device may be operated, so as to output an optical signal pattern that cannot be seen through the eyes of the user. Hereinafter, as an example of the optical radiation device, an exemplary embodiment of the infrared ray (IR) emitter will be described in detail.

A method for transferring content by using an infrared ray (IR) code according to the present invention corresponds to a technology of performing coupling between a mobile device and a content device, by operating an infrared ray (IR) emitter in a neighboring (or peripheral) content device in accordance with a request of the mobile device in order to express an infrared ray (IR) code, and by capturing the IR code through a camera provided in the mobile device and recognizing the captured IR code.

Figure 23:
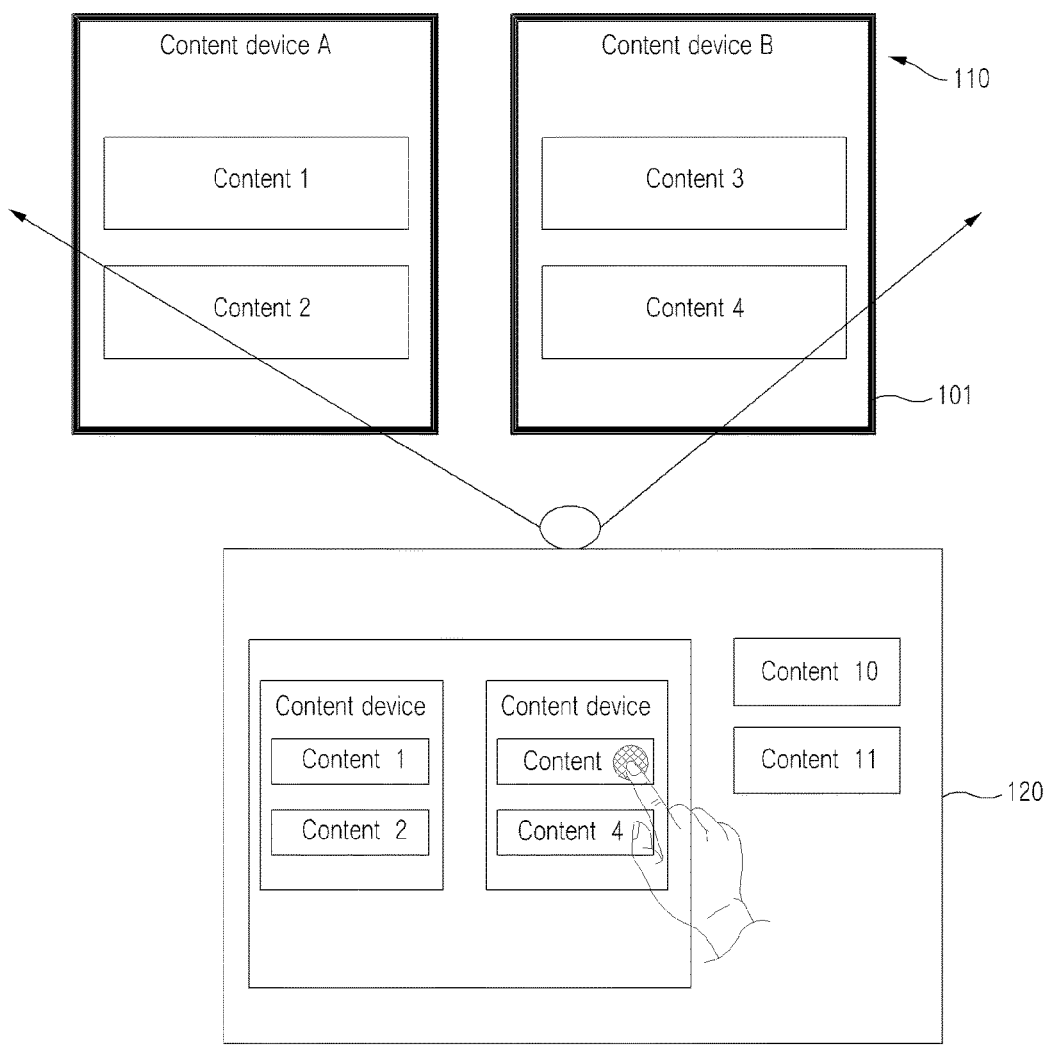

Referring to FIG. 23, the coupling controller of the mobile device 120 may operate a camera in accordance with the user's request (e.g., executing a dedicated application or operating a web browser, so as to access a specific URL, and so on), and, then, the coupling controller of the mobile device 120 may express (or display) a captured camera image of the content device 110 on the display of the mobile device 120. For example, among the display area of the display, the coupling controller of the mobile device 120 may display the camera image on at least a portion of the display area and may display a list of content stored in a local area of the mobile device 120 on the remaining portion of the display area.

The user may observe (or look at) the camera image, which is displayed on the display of the mobile device 120, and, then, after choosing a content that the user wishes to transfer to the mobile device 120 from the diverse content displayed on the display of the content device 110, the user may move the mobile device 120 or operate the camera function, so that the chosen (or wanted) content can be captured in a camera image of the mobile device 120. Thereafter, by using camera image of the mobile device 120, the content device 110 and the content of the content device 110 may be selected.

When a specific content is selected from the camera image of the mobile device, the coupling controller of the mobile device 120 transmits a peripheral device search message for verifying whether or not the content device 110 exists within a predetermined distance range.

Figure 24:
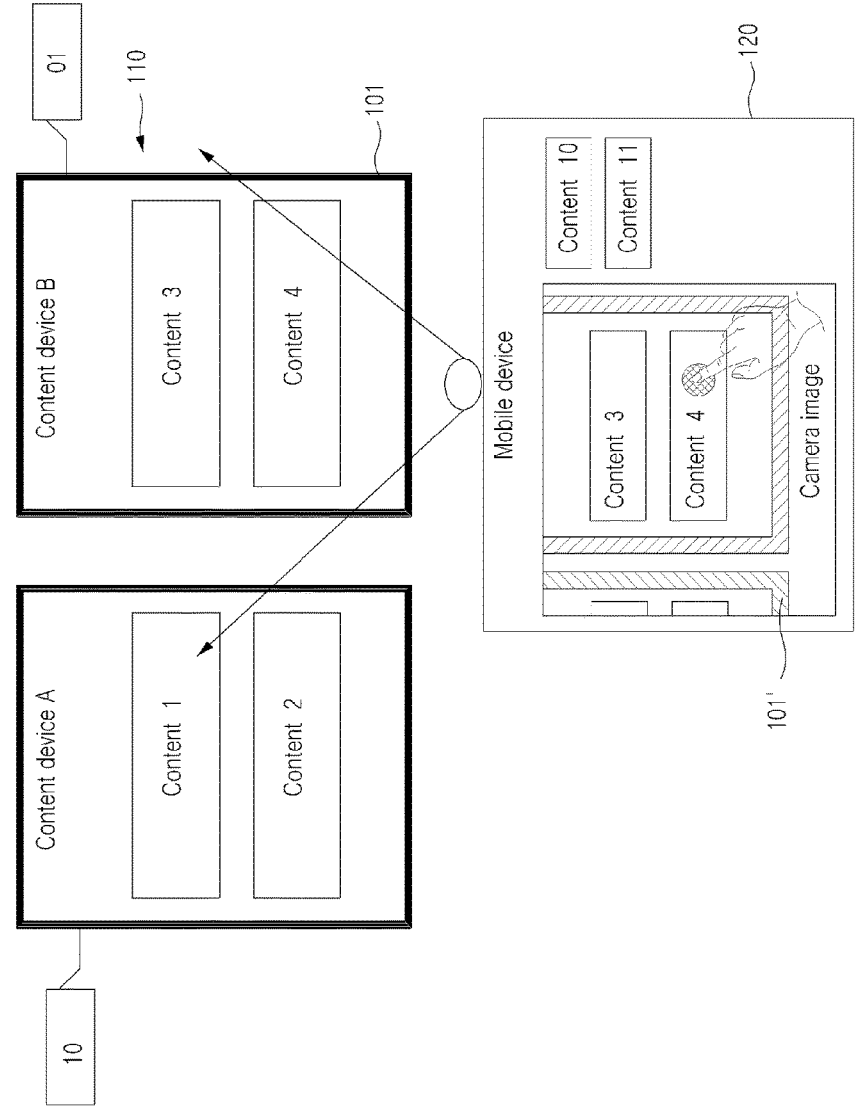

After receiving the peripheral device search message from the mobile device 120, the coupling controller of the content device 110 may operate the IR emitter 101 by using a pre-assigned code. For example, as shown in FIG. 24, when code 10 is assigned to content device A, and when code 01 is assigned to content device B, if a first peripheral device search message is received, each of the content devices A and B may operate the IR emitter 101 in accordance with a first bit value of the codes assigned to each device.

When the content device 110 operates the IR emitter 101, whether or not the IR emitter 101 is being operated cannot be verified through the human eye. However, as shown in FIG. 24, in a camera preview image of the mobile device 120, the operation status (or activation status) of the IR emitter 101' is expressed by using a purple color group. And, by doing so, the user may be capable of verifying whether or not the IR emitter 101 is being operated (or activated) through the camera preview image, and by detecting the purple color group, the system may also be capable of verifying that the IR emitter 101 is being activated. Among the multiple infrared ray wave bands, as the infrared ray wave band becomes closer to 850 nm, the operation status (or activation status) may be verified by the human eye, and, as the infrared ray wave band becomes closer to 940 nm, the operation status (or activation status) cannot be verified by the human eye. The color that is being expressed on the camera may vary depending upon the type of IR emitter 101 and wave.

After operating the IR emitter 101 in accordance with the first bit value of the assigned code, the coupling controller of the content device 110 may transmit a code expression complete message.

After transmitting the peripheral device search message, the coupling controller of the mobile device 120 waits for a predetermined period of time until all code expression complete messages are received from one or more content devices 110. Then, when the predetermined period of time has elapsed, a second peripheral device search message is transmitted. At this point, the coupling controller of the mobile device 120, which has received the code expression complete message, may extract a frame from the camera image and may perform an image capturing process.

After receiving the second peripheral device search message, the coupling controller of the content device 110 may operate the IR emitter 101 in accordance with a second bit value of the pre-assigned codes. As opposed to FIG. 24, according to the second code bit values, since content device A corresponds to 0, and since content device B corresponds to 1, the IR emitter 101' of content device B shown in the camera image is displayed in purple. As described above, the coupling controller of the mobile device 120 waits for a predetermined period of time until all code expression complete messages are received, and, when the predetermined period of time has elapsed, the coupling controller of the mobile device 120 may extract a frame from the camera image or may perform an image capturing process.

By performing an exchange of peripheral device search message and code expression complete message twice, the coupling controller of the mobile device 120 gains two images. Evidently, depending upon the length of the code, the number of images may be increased as much as the number of code bits.

By performing this process, the coupling controller of the mobile device 120 may extract an infrared ray (IR) code from the camera image, and, among multiple IR codes, by using an IR code corresponding to a location nearest to a touch position of the user, or by using an IR code corresponding to a location that is expressed to have the largest surface area, the coupling controller of the mobile device 120 may send a request to perform coupling to the neighboring content device 110 by transmitting a coupling request message after loading the selected IR code in the coupling request message. After receiving the coupling request message, when the IR code included in the coupling request message is identical to a pre-assigned code, the coupling controller of the content device 110 may transmit a coupling grant message to the mobile device 120. After receiving the coupling grant message, the coupling controller of the mobile device 120 may perform coupling with the content device 110.

While selecting a specific content from the camera image, when the user drags the selected content and moves the selected content outside of the camera image and, then, performs a touch up motion, the selected content is displayed (or expressed) outside of the camera image, and such user operation corresponds to a user input transferring content of the content device 110 to the mobile device 120.

At this point, among the contents included in the camera image of the mobile device 120, a method for deciding a content that is to be transferred may correspond to having the content device 110 include IR emitter length ratio of the content device 110 in the coupling grant message and then transmit the processed message, and to having the mobile device 120 compare a length ratio of the IR emitter, which is detected from the camera image with respect to the location point touched by the user, with a length ratio of the IR emitter, which is included in the coupling grant message, thereby determining whether or not to select the corresponding content.

Figure 25:
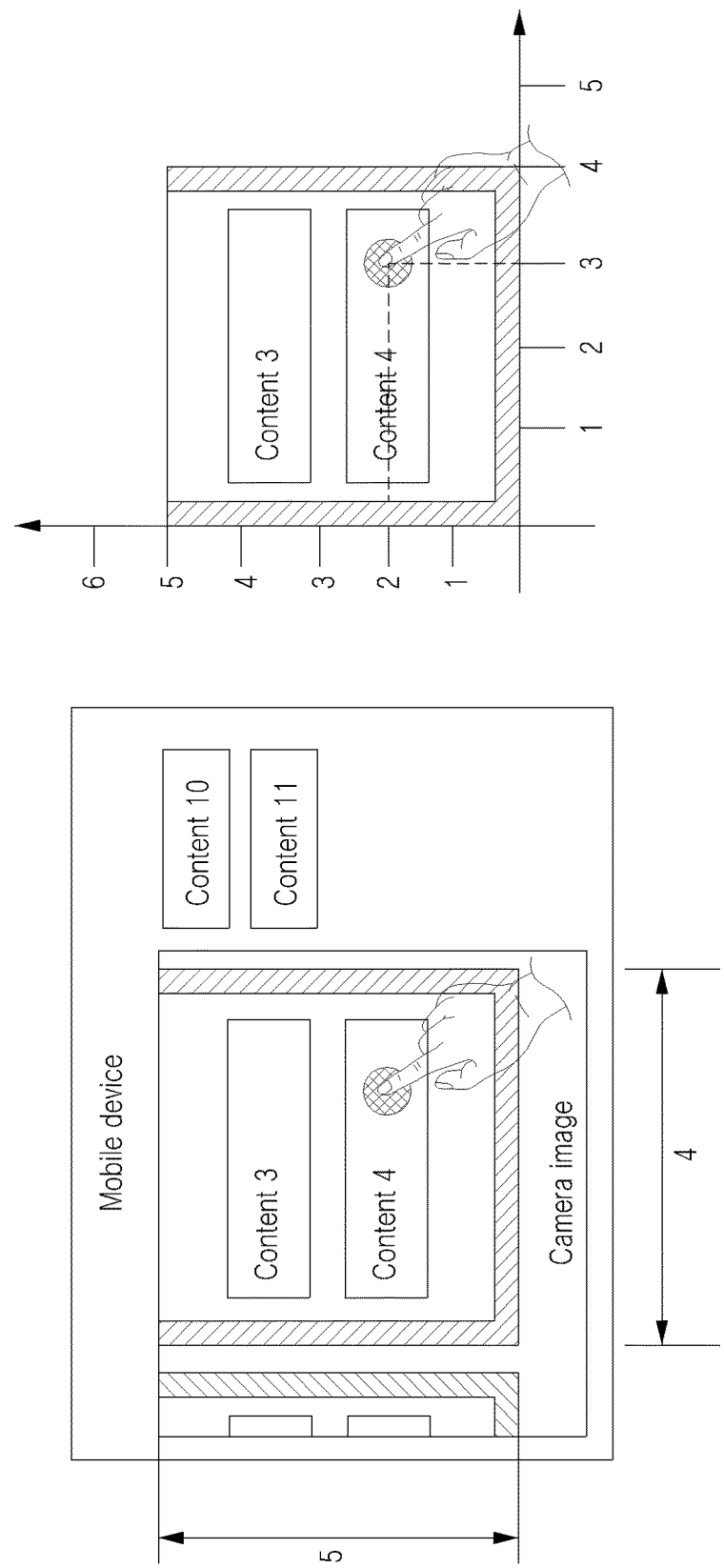

For example, as shown in FIG. 25, when a horizontal-to-vertical length ratio (horizontal:vertical) of the actual IR emitter, which is included in the coupling grant message, corresponds to 2:3, and when a horizontal-to-vertical length ratio (horizontal:vertical) of an IR emitter, which is recognized in the camera image, corresponds to 4:5, it will be apparent that the camera has not expressed 1/6 of the actual IR emitter in the camera image.

Therefore, it may be assumed that the camera is expressing only 5/6 of an upper portion or lower portion of the actual IR emitter. At this point, among the code expression area of the camera image, since a center point of a vertical area is located at a position higher than a center point of a horizontal area, it may be assumed that the camera image is expressing only the lower 5/6 portion of the actual IR emitter. As shown in FIG. 25, since a location point of the user's touch (e.g., content 4) is located at coordinates of (3, 2) from a lower left location point within the 5/6 portion of the IR emitter, it may be assumed that the user has touched the location point corresponding to coordinates (3, 2) from the lower left location point of the content device within the camera image, and it may also be assumed that such touch motion may be interpreted as the user's intention to transfer a content, which is located at a location point corresponding to coordinates (3, 2) from the lower left location point of the actual content device. Since the IR emitter is located on a border area of the actual content device, when it is assumed that the size of the display of the actual content device and the size of the IR emitter are identical within a predetermined error range, it may be assumed that the user has touched content 4, which is located at a location point corresponding to coordinates (3, 2) with respect to the lower left portion of the actual content device. While touching the position of content 4, when the user drags the content outside of the camera image and then performs a touch up motion, the mobile device may transmit a content transfer message, which includes ratio information on the IR code detection area and the user touch location point information, to the content device 110, which is coupled with the corresponding mobile device 120, through the content transfer unit. Thereafter, the content transfer unit of the coupled content device 110 may transfer the content, which exists in the corresponding location point of the display, to the mobile device 120, based upon the information included in the content transfer message.

Figure 26:
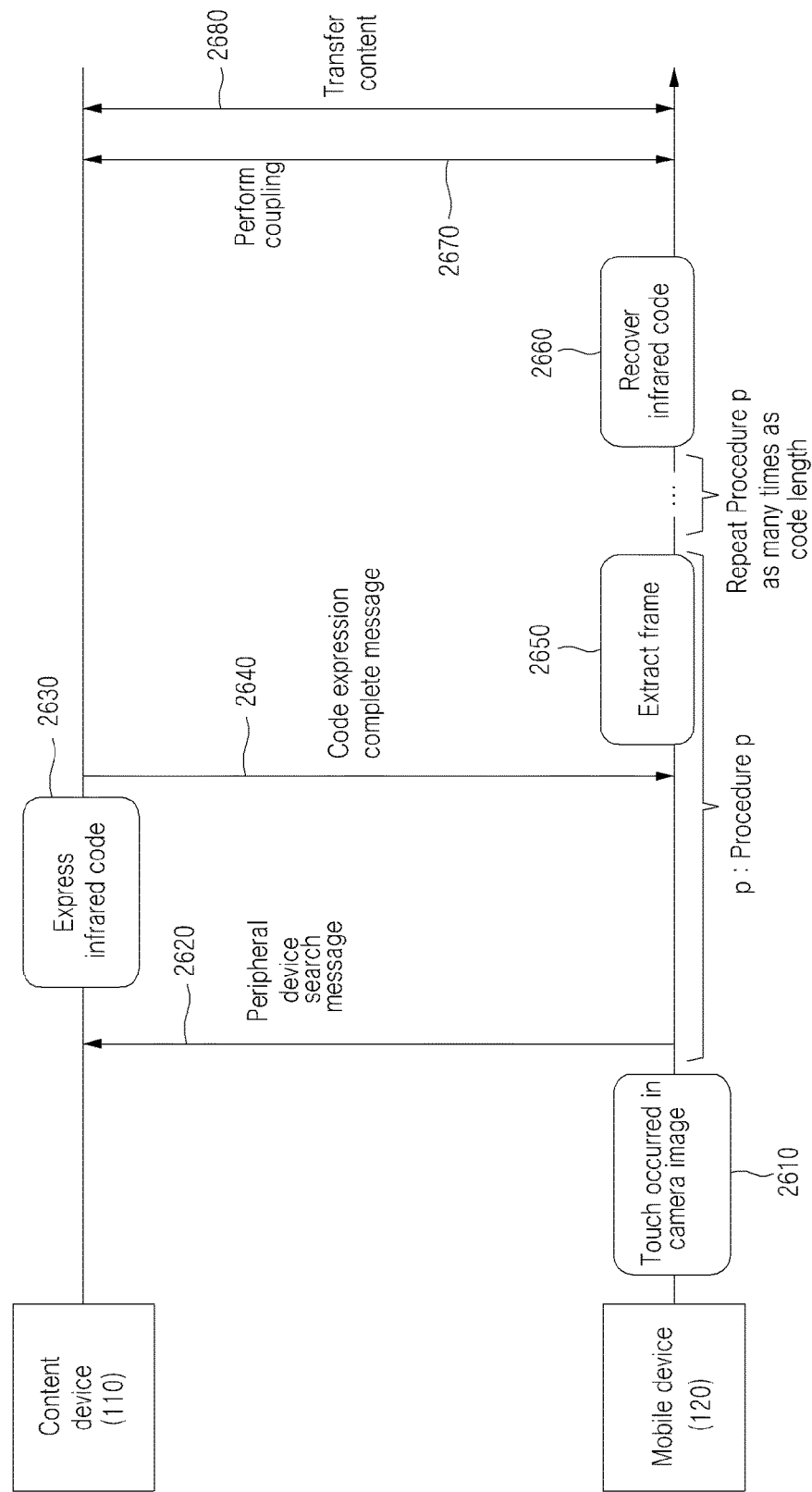

FIG. 26 illustrates a flow chart showing a method for transferring content by using an infrared ray code.

In step (2610), when the user executes an application through his (or her) mobile device, or when the user accesses a specific URL (e.g., www.ircode.com) through a web browser, the coupling controller of the mobile device 120 may display (or express) a camera preview image on the screen.

In step (2620), when the user performs a touch down motion after selecting a specific content from the camera preview image, the coupling controller of the mobile device 120 may transmit a peripheral device search message.

In step (2630), when the peripheral device search message is received from the mobile device 120, by operating the IR emitter in accordance with a pre-decided assignment code, the coupling controller of the content device 110 may express (or display) the infrared (IR) code.

In step (2640), after operating (or activating) the IR emitter in accordance with the assignment code, the coupling controller of the content device 110 may transmit a code expression complete message to the mobile device 120.

In step (2650), after receiving all code expression complete messages from the content device, the coupling controller of the mobile device 120 may extract a frame from the camera.

When the above-described process steps (2620 to 2650) are collectively referred to as procedure P, the procedure P is repeated between the content device 110 and the mobile device 120 in accordance with a length of the code being assigned to the content device 110.

In step (2660), after completing all repetition of procedure P, the coupling controller of the mobile device 120 may define infrared ray code areas by recovering the IR code from the frames that are collected during procedure P. Thereafter, the coupling controller of the mobile device 120 may verify which IR code area is most closely located to the touch down location point of the user (i.e., location point of the touch down motion performed by the user).

In step (2670), when the IR code area most closely located to the touch down location point of the user and the respective code value are verified, the coupling controller of the mobile device 120 may include the verified IR code to a coupling request message and may transmit the processed coupling request message to the content device, which has transmitted the code expression complete message. At this point, the coupling request message may include a horizontal/vertical ratio of the IR code area, which is defined in the mobile device 120, and coordinate information of the user's touch down location point (or user touch down coordinate information). Accordingly, in case the IR code included in the coupling request message is identical to the code assigned to the content device 110, the coupling controller of the content device 110 may transmit a coupling grant message, which includes a content ID corresponding to the user touch down coordinates, based upon the horizontal/vertical ratio of the IR code area and the user touch down coordinate information, which are included in the coupling request message. At this point, the coupling controller of the mobile device 120 may perform coupling with the content device 110, which has transmitted the coupling grant message.

In step (2680), based upon the content ID included in the coupling grant message, the content transfer unit of the mobile device 120 may request the corresponding content by transmitting a content download request message to the content device 110. And, after receiving the content download request message from the mobile device 120, the content transfer unit of the content device 110 may complete the content transfer by loading content information in the content download request message and by transmitting processed message to the mobile device 120.

Figure 27:
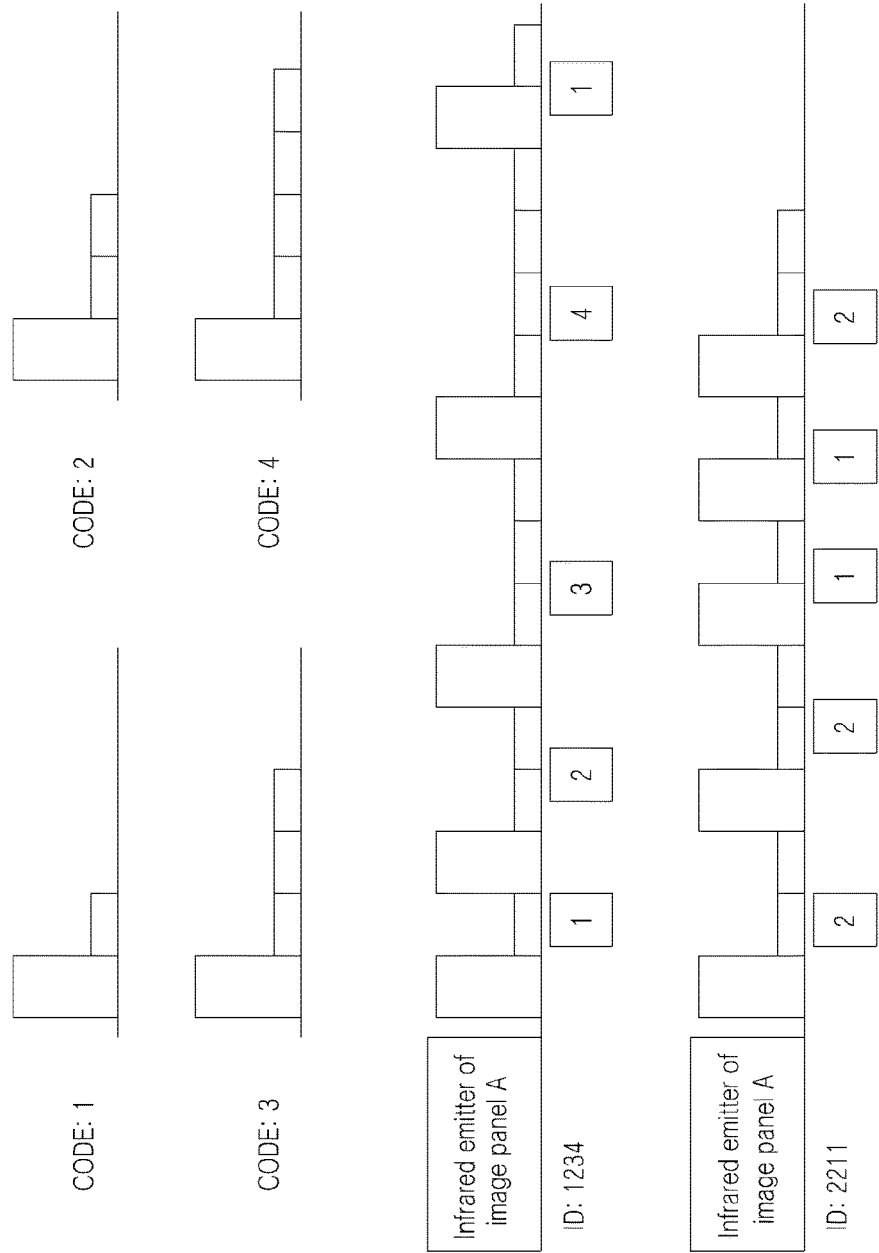

FIG. 27 illustrates an exemplary operation of the infrared ray emitter.

When power is applied to the infrared ray (IR) emitter, the IR emitter may be operated as shown in FIG. 27 in accordance with a corresponding ID value. In case the IR emitter is assigned with an ID of 1234, according to code 1, since the first value of the assigned ID is equal to 1, IR light is emitted from the IR emitter in a flickering format, wherein a light-emitting time (or light-on time) is equal to 1, and wherein a light-off time is equal to 1. Additionally, since the subsequent codes correspond to 2, 3, and 4, the IR light is emitted from the IR emitter in a flickering format, wherein the light-emitting time (or light-on time) is equal to 1, and wherein the light-off time is equal to 2, 3, and 4, respectively. In case the assigned ID corresponds to 1234, the flickering of the IR light is respectively performed in accordance with codes 1, 2, 3, and 4, and when the code is ended, the flickering pattern starts once again by the order of 1, 2, 3, and 4. Similarly, in case the IR emitter is assigned with an ID of 2211, in accordance with the given codes 2, 2, 1, and 1, the IR light is emitted from the IR emitter in a flickering format, wherein the light-emitting time (or light-on time) is equal to 1, and wherein the light-off time is equal to 2, 2, 1, and 1, respectively.

When the IR emitter, which is operated as described above, is captured by the mobile device, the mobile device may record the changes in color from black to purple (Black→Purple) and from purple to black (Purple→Black) and may also record the flickering time in the camera preview image. In other words, each time the mobile device collects a frame from the camera preview image, the mobile device may record the flickering time of the IR emitter, and, based upon the flickering time of the IR emitter, IR code values may be recovered.

In the above-described exemplary embodiments, although the transfer of contents are described to be performed from the content device to the mobile device, by varying the touch shape, touch direction, touch order, and so on, or by applying a separate input, the transfer of contents may also be performed from the mobile device to the content device.

Generally, a mobile device is connected to a wireless communication network corresponding to 3G or LTE or higher, and a large number of content devices using a shared IP address may exist near the mobile device. In this case, the system for transferring content according to the present invention may be operated in accordance with the following procedure.

Figure 28:
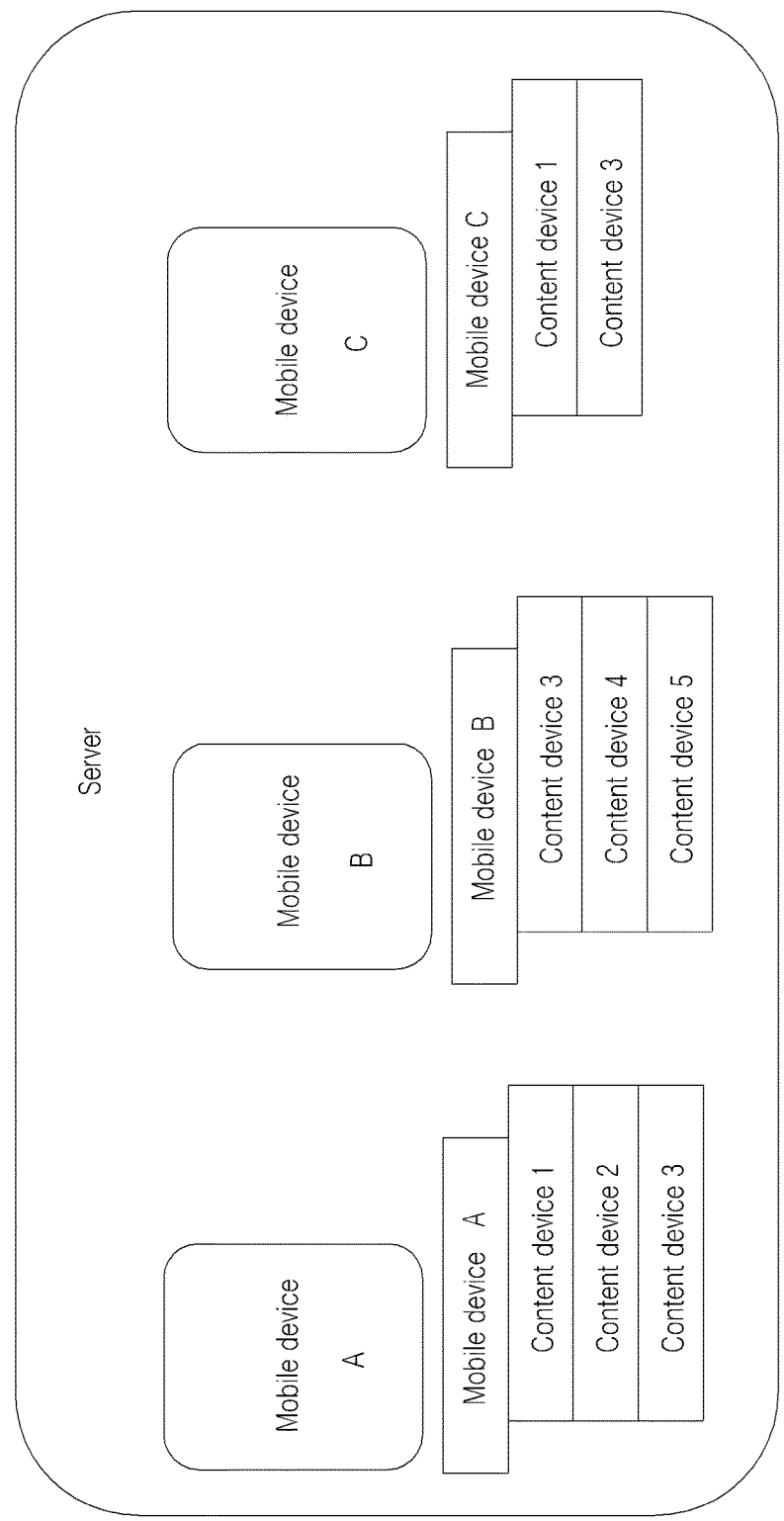

FIG. 28 illustrates a structure for configuring a list of peripheral content devices existing near the mobile device in a server with respect to a service set identifier (SSID) report of the mobile device.

In order to perform content transfer to the content device, the mobile device may execute an application (or app) in an initialization step or may be connected to a related server when accessing a URL. When it is assumed that the server is informed of (or aware of) an SSID or GPS information of wireless LAN APs neighboring all content devices, when execution of an application or web browser is initiated, if an application or web browser of the mobile device periodically transmits an SSID of a neighboring wireless LAN AP or a GPS value of the mobile device, the server may configure and maintain a table, which consists of a pair of user equipment IDs assigned to the content device and the mobile device.

When the mobile device transmits an SSID of a neighboring wireless LAN AP or GPS coordinate information to the server, as shown in FIG. 28, by mapping an ID of the content device, which includes an AP having the corresponding SSID with respect to the mobile device ID, to the mobile device ID, or by mapping IDs of content devices, which are located within a predetermined distance range in comparison with the GPS coordinates of the mobile device, to the mobile device ID, the server may manage the IDs in the form of a table.

When a URL is accessed by using a user application or web browser, as described above, a mapping table may be used as a list of target devices, which is provided to the user application or web browser, so as to transmit a message that is transmitted to and from the mobile device and the content device in order to perform coupling between the mobile device and the content device.

For example, when the user inputs a touch command related to the transfer of content in the camera image, the mobile device transmits a peripheral device search message to content devices indicated in the list shown in the mapping table. The mobile device, which has transmitted the peripheral device search message, may be coupled with the content devices, which have received the peripheral device search message, after performing diverse processes, such as activating the IR emitter, transmitting a code expression complete message, requesting coupling, granting coupling, and so on.

In another example, by using SSID of the wireless LAN AP or GPS information, which is periodically transmitted, when execution of an application or web browser of the mobile device is initiated, the server maintains a table, which is configured of a pair of wireless LAN AP SSID and a mobile device ID. In other words, SSID information may be managed by creating a mapping table in a format that indicates which mobile device exists within a neighboring area based upon the SSID of the wireless LAN AP. And, similarly, this mapping table may be used as a list of target devices, which is provided to the user application or web browser, so as to transmit a message that is transmitted to and from the mobile device and the content device in order to perform coupling between the mobile device and the content device.

By using the above-described structure, when coupling and content transfer are to be performed between the mobile device and the content device, by limiting the number of devices to a small number and by transmitting the peripheral device search message to the limited number of devices, the complicated process of having the peripheral device search message transmitted to all devices and having all of the devices transmit the respective response may be prevented.

The present invention provides a new form of advertising model by using a technology of transferring content between devices.

Figure 29:
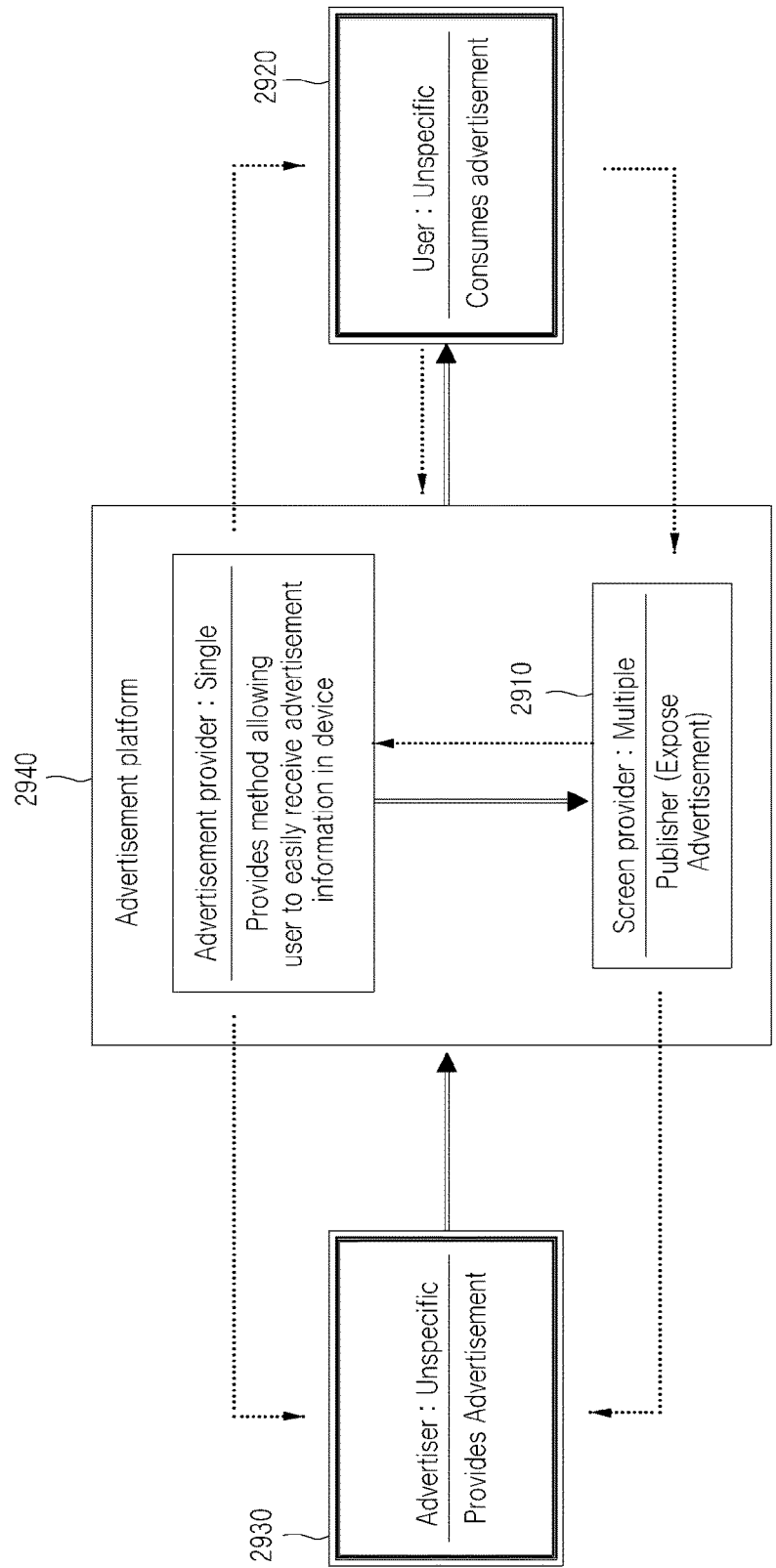
FIG. 29 illustrates an example of an advertisement providing environment according to an exemplary embodiment of the present invention.

FIG. 29 illustrates an example of an advertisement providing environment according to an exemplary embodiment of the present invention. At this point, FIG. 29 indicates an advertiser (or sponsor) 2930, an advertisement platform 2940, a publisher 2910, and a user 2920. The advertiser 2930 and the user 2920 may substantially refer to user equipments, such as personal computers (PCs) or smart phones, which are used by the advertiser 2930 and the user 2920. More specifically, in FIG. 29, arrows shown between the advertiser (or sponsor) 2930, the advertisement platform 2940, the publisher 2910, and the user 2920 may indicate that data can be transmitted and received to and from the devices used by the advertiser (or sponsor) 2930, the advertisement platform 2940, the publisher 2910, and the user 2920 through a wired or wireless network.

The advertisement platform 2940 may signify a system configured to perform bidding of advertisement of the advertiser 2930, matching between advertisement and keyword, alignment of advertisement or advertiser, provision of advertisement to the publisher 2910, charging fees respective to advertisement exposure, and so on. Among the general and technical details of the advertisement platform 2940, detailed description of details, which can be understood by referring to related art methods that are related to search advertisement and/or banner advertisement platforms, will be omitted for simplicity.

In the present invention, as an advertisement display area configured to expose advertisement of the advertiser 2930 through an application related to the advertisement platform 2940 or through a web page, the publisher 2910 may refer to a content device, such as digital signage owned by a screen provider. At this point, the publisher 2910 may provide pages included in a screen, and the publisher 2910 may receive advertisements that are to be exposed through the pages included in the screen and may then expose the received advertisements.

In this specification, the "exposure" of an advertisement may refer to providing promotion-related content, such as text, images, sound, moving picture images, hyperlinks, and so on, that are associated to the advertiser 2930, through the publisher 2910. Additionally, the "selection" of an exposed advertisement may refer to an occurrence of a specific situation, which the advertiser 2930 had initially intended to achieve by delivering the promotion-related content, when the user 2920 shows a reaction, such as touching a touchscreen respective to the provided promotion-related content, such as a text, image, and so on, which is exposed through the publisher 2910. At this point, for example, the situation induced by the advertiser 2930 may include a situation of a page that is related to the advertiser 2930 being exposed to the user 2920, an action performed by the user 2920 of subscribing to a page or purchasing an item through a page that is related to the advertiser 2930, and an action performed by the user 2920 having selected an advertisement of downloading contents related to the corresponding advertisement, and so on.

The advertisement system according to the present invention may perform functions of an advertisement platform, such as exposing advertisement related content of the advertiser 2930 through a publisher 2910, which corresponds to a content device, and, among the content exposed through the publisher 2910, transferring a specific content, which is selected by the user 2920, to the user 2920.

Figure 30:
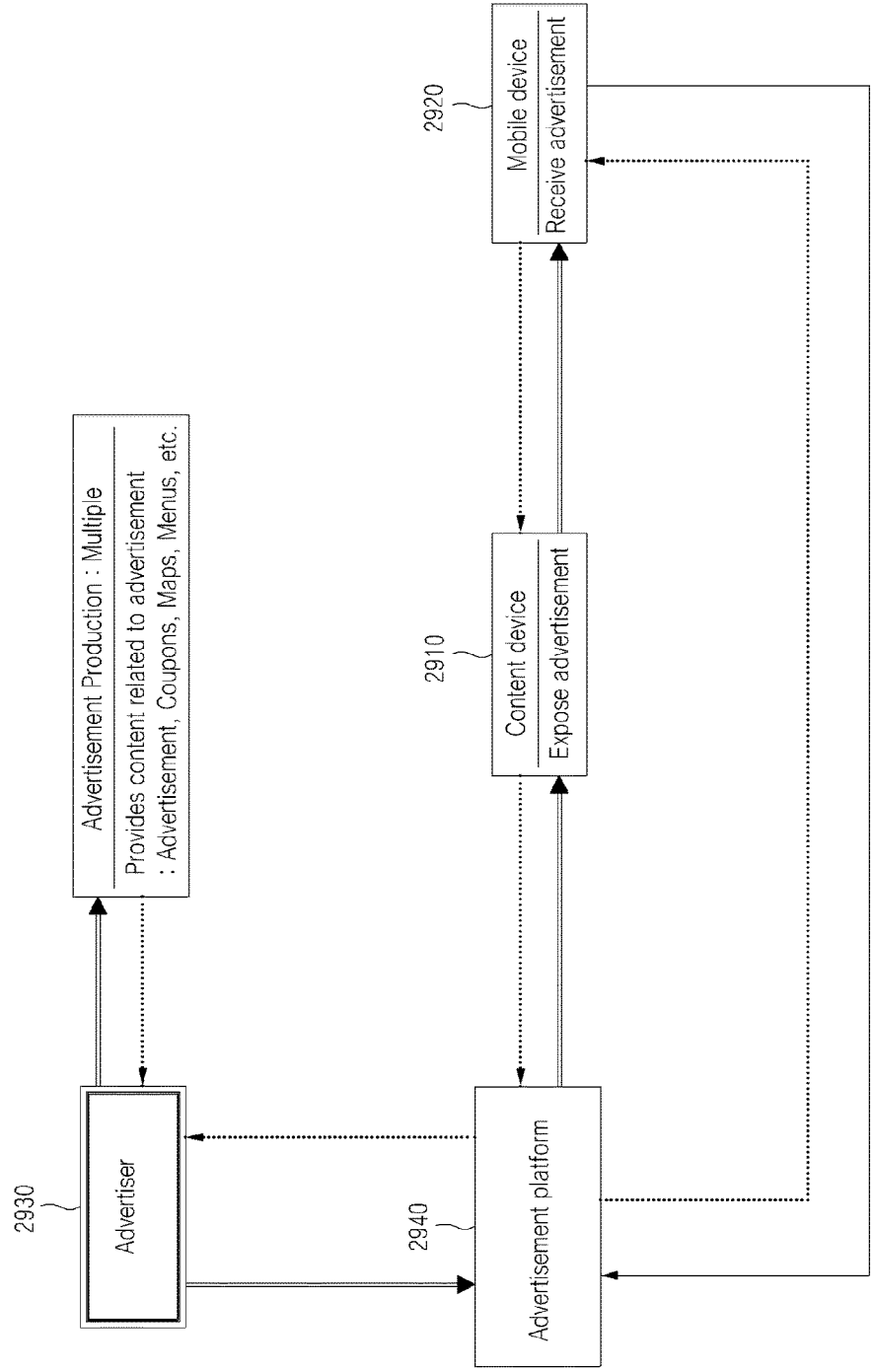
FIG. 30 illustrates an exemplary advertisement process according to an exemplary embodiment of the present invention.

FIG. 30 illustrates an advertising process in the advertisement providing environment, which is described in FIG. 29, according to an exemplary embodiment of the present invention. In FIG. 30, the content device may refer to the publisher, which is described above with reference to FIG. 29, and the mobile device may refer to the user, and the same reference numerals will be used herein for simplicity in the description.

The advertiser 2930 may ensure advertisement contents that are produced and provided by an advertisement production company. And, at this point, the advertisement content may refer to all types of advertisement objects, such as advertisement, coupons, maps, menus, and so on. The advertisement production company may supply advertisement contents as an output for resolving the requirements of the advertiser 2930. And, accordingly, the advertiser 2930 may pay advertisement fees for the number of advertisements or the running time of the advertisements respective to the advertisement content.

The advertiser 2930 may register an advertisement content to the advertisement platform 2940 and may pay advertisement fees in accordance with the number of advertisement exposures respective to the registered advertisement content. Additionally, the advertisement platform 2940 may expose advertisement content of the advertiser 2930 through the content device 2910. In order to do so, the content device 2910 may provide a screen area as the publisher, and, at this point, as an area that can express (or display) the advertisement, the screen may refer to an asset having different values depending upon time and place.

The advertisement exposure of the advertisement content may be classified as advertising exposure, pageview, pageview on screen, pageview on mobile, and so on. At this point, advertising exposure may refer to the conventional method of exposing advertisements non-related to the user's intentions, and a pageview may refer to a method of exposing advertisements (e.g., search advertisements, and so on), which are displayed based upon a request made by the user. Additionally, as a pageview method based upon a screen touch performed by the user, a pageview on screen may refer to a method of exposing a specific advertisement that is selected by the user from a variety of exposed advertisements within the content device 2910. And, as a pageview method within the user's mobile device, the pageview on mobile may refer to a method of transferring content related to the specific advertisement that is selected by the user to a mobile device 2920, which is used by the user. At this point, the advertisement platform 2940 may provide the advertiser 2930 with an advertisement report on the time of exposure or number of exposures of the advertising exposure, pageview, pageview on screen, pageview on mobile, and so on, with respect to an advertisement content, which is registered by the corresponding advertiser 2930. And, accordingly, the advertiser 2930 may pay advertisement fees for the time of exposure or number of exposures of the advertising exposure, pageview, pageview on screen, pageview on mobile, and so on, with respect to the advertisement content registered by the corresponding advertiser 2930. Furthermore, the advertisement platform 2940 may charge fees to the advertiser 2930 of the corresponding advertisement for screen occupancy of the advertisements that are being exposed through the content device 2910, and, then, the advertisement platform 2940 may pay the collected fee to a screen provider related to the content device 2910.

The content device 2910 may receive advertisement content of the advertiser 2930 from the advertisement platform 2940 and may expose the received advertisement content. At this point, by exposing advertisement information on the screen, the content device 2910 may first provide advertising exposure or pageview of the advertisement content and may then provide pageview on screen with respect to the advertisement content, which is selected by the user by touching the screen (or performing screen touch). According to the exemplary embodiment, the content device 2910 may provide an advertisement service function for a pageview on mobile. At this point, the advertisement service function may include a content transfer function for transferring advertisement content, which is selected by the user, among the advertisement content exposed to the content device 2910, to the mobile device 2920.

The advertisement platform 2940 may provide the advertisement service function to the mobile device 2920 through the content device 2910, and, at this point, the advertisement service function may include personal advertisement information management function, such as receiving advertisement content through application/web page provision, user content upload, history management, and so on. Herein, the advertisement platform 2940 may acquire information within the content device 2910, which has transferred the advertisement content to the mobile device 2920. Additionally, in the advertisement platform 2940, coupons may be provided to the mobile device 2920 as an output of advertisement acquisition, thereby providing gain in value, such as discount.

As an advertisement consuming target, the mobile device 2920 may use advertisement that is exposed on the content device 2910 (e.g., exposed advertisement, such as advertising exposure, pageview, pageview on screen, pageview on mobile, and so on). And, most particularly, in order to use the advertisement that is exposed on the content device 2910 as a form of pageview on mobile, the content transfer function included in the advertisement service function may be used. In other words, the mobile device 2920 may perform functions of consuming advertisement through an additional in-application (or in-app) or in-web page, consuming advertisement in accordance with advertisement content reception and pageview on screen, and providing status information related to advertisement consumption.

An advertisement system, which performs the functions of the above-described advertisement platform 2940, may expose advertisements of the advertiser 2930. And, when the user selects a specific advertisement, among multiple advertisements exposed on the content device 2910, by using his (or her) mobile device 2920, the advertisement system may provide a content transfer function, which transfers content related to the specific advertisement to the mobile device 2920. At this point, the content device 2910 may deliver information on the mobile device 2920, which has selected a specific advertisement among the exposed advertisements, information on a specific advertisement, which is selected by the mobile device 2920, and so on, to the advertisement system. And, accordingly, the advertisement system may identify the mobile device 2920 and may also identify the advertisement, which is selected by the mobile device 2920, based upon information received from the content device 2910.

For example, after receiving information on the specific advertisement, which is selected by the user, from the content device 2910, the advertisement system may transmit content related to the specific advertisement to the mobile device 2920 through the content device 2910. More specifically, the content device 2910 exposes the advertisement receive from the advertisement platform 2940, and, among the exposed advertisements, when a specific advertisement is selected by the user, after performing coupling with the mobile device 2920, information on the specific advertisement, which is selected by the user, may be transmitted to the advertisement platform 2940. Accordingly, the advertisement platform 2940 may transmit content related to an advertisement corresponding to the information, which is received from the content device 2910, to the content device 2910. At this point, the content device 2910 may transmit content received from the advertisement platform 2940 to the mobile device 2920, which is coupled to the content device 2910.

In another example, the advertisement system receives information on a specific advertisement, which is selected by the user, from the content device 2910, and also receives information on the mobile device 2920, which is coupled with the content device 2910. Thereafter, the advertisement system may transmit content related to the specific advertisement to the mobile device 2920. For example, the advertisement system identifies the mobile device 2920 of the user having selected the specific advertisement based upon the information received from the content device 2910. Thereafter, the advertisement system may transmit an application/web page including the content, which is related to the specific advertisement, to the mobile device 2920 by using a callback URL service.

The advertisement method according to the present invention may include at least two or more operations based upon the details on the advertisement system, which is described above in detail with reference to FIG. 29 and FIG. 30.

As an example of the present invention, the content transfer function may refer to transmitting content to the mobile device 2920, wherein the content is received from the advertisement platform 2940 by performing coupling between the content device 2910 and the mobile device 2920.

As described above, the system and method for transferring content among multiple devices have the following advantages. According to an exemplary embodiment of the present invention, by allowing content and target devices to be selected by using an intuitive method, the user may be capable of transferring wanted content to a wanted device without having to be provided with any particular education. According to another exemplary embodiment of the present invention, by using diverse methods and means for identifying each device from a group of devices, the process of selecting a device to which content is to be transferred may be performed automatically, and coupling of the devices may be performed more easily and more accurately. According to a further exemplary embodiment of the present invention, a new form of advertisement model may be realized by using the technology of transferring content among devices.

The above-described device according to the exemplary embodiment of the present invention may be realized in the form of a hardware component, a software component, and/or a combination of a hardware component and a software component. For example, the device and corresponding components according to the above-described exemplary embodiments of the present invention may be realized by using at least one or more universal computers or special-purpose computers, such as a processor, a controller, an arithmetic logic unit (ALU), a digital signal processor, a field programmable array (FPA), a programmable logic unit (PLU), a microprocessor, or any type of device that can execute and respond to an instruction (or command). A processing device may execute an operating system (OS) and at least one or more software application, which is executed within the operating system (OS). Additionally, the processing device may respond to the execution of a software application, so as to access, store, manipulate, process, and generate data. In order to facilitate and simplify the understanding of the present invention, the present invention may be described to include only one processing device. However, it will be apparent to anyone skilled in the art that the processing device may include a plurality of processing elements and/or may include multiple types of processing elements. For example, the processing device may include multiple processors, or the processing device may include one processor and one controller. Additionally, other processing configuration, such as a parallel processor, may be configured herein.

The software may include a computer program, a code, an instruction, or a combination of one or more of the above. And, the software may configure a processing device, so that the processing device can be operated as intended, or the software may independently or collectively instruct (or command) the processing device. In order to be interpreted by the processing device, or in order to provide an instruction or data to the processing device, the software and/or data may be permanently or temporarily embodied in any type of machine, a component, a physical equipment (or device), a virtual equipment, a computer storage medium or device, or a transmitted signal wave. Since the software is dispersed (or scattered) within a computer system being connected to a network, the software may be stored or executed by using in a dispersion method. The software and data may be stored in one or more computer-readable recording media.

The method according to the exemplary embodiment of the present invention may be realized in a program command (or instruction) format that may be executed by using diverse computing means, so as to be recorded in a computer-readable medium. Herein, the computer-readable medium may independently include a program command (or instruction), a data file, a data structure, and so on, or may include a combination of the same. The program command being recorded in the medium may correspond to a program command that is specifically designed and configured for the exemplary embodiments of the present invention, or the program command may correspond to a program command that is disclosed and available to anyone skilled in or related to computer software. Examples of the computer-readable recording medium may include magnetic media, such as hard discs, floppy discs, and magnetic tapes, optical media, such as CD-ROMs, DVDs, and so on, magneto-optical media, such as floptical discs, and hardware devices specially configured (or designed) for storing and executing program commands, such as ROMs, RAMs, flash memories, and so on. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the operations of the exemplary embodiment of the present invention, and vice versa.

It will be apparent to those skilled in the art that various modifications and variations can be made in the present invention without departing from the spirit or scope of the inventions. For example, the above-described techniques may be executed in an order different from that described in the description of the present invention, and/or the components of the above-described system, structure, equipment (or device), circuit, and so on, may be combined in a format different that of the above-described method according to the present invention, and an adequate result may be achieved even if the above-described components of the present invention are replaced by any other component or its equivalent.

Thus, it is intended that the present invention covers other realizations and other embodiments of this invention provided they come within the scope of the appended claims and their equivalents.

What is claimed is:

1. A display device, comprising:
a coupling controller hardware device configured to identify a user equipment in accordance with a content transfer request and to perform coupling with the identified user equipment;
a content transfer unit configured to transmit content to the user equipment or to receive content from the user equipment, when coupling is completed; and
a display configured to receive a touch input,
wherein the coupling controller hardware device is further configured to:
identify a touch input on the display as the content transfer request and to request for status information to a peripheral device,
store a time of recognition at which a touch is recognized and a time of cancellation at which the touch is cancelled, and
compare the time of recognition and the time of cancellation with recognition information, the recognition information being acquired by using a proximity sensor within the user equipment, when the recognition information is received from the user equipment as the status information, and to perform coupling with the user equipment based upon the compared result.

2. The device of claim 1,
wherein the coupling controller hardware device is further configured to:
generate touch information respective to the touch input, when the touch input is recognized, and
compare the touch information with recognition information within the user equipment, when the recognition information is received from the user equipment as the status information, and to perform coupling with the user equipment based upon the compared result.

3. The device of claim 2, wherein the recognition information includes at least one a movement time, movement distance, and movement pattern of the user equipment, and wherein the coupling controller hardware device performs coupling with the user equipment, when the recognition information corresponds to the touch information.

4. The device of claim 1, further comprising:
a camera flash, and
wherein the coupling controller hardware device is further configured to:
display an image code through the display or the camera flash, when the touch input is recognized, and
compare the image code with a code value, when the code value recognized by the user equipment is received from the user equipment as the status information, and to perform coupling with the user equipment based upon the compared result.

5. The device of claim 4, wherein the image code includes information for identifying the content, and
wherein the image code is configured as a code being displayed as a pattern having at least one pre-decided color or as a barcode or a Quick Response (QR) code.

6. The device of claim 4, wherein the code value corresponds to a value of recognizing the image code displayed on the display by the user equipment by using at least one of an illuminance sensor, a camera, an RGB sensor, and an image sensor.

7. The device of claim 1, wherein the recognition information includes a first time of change at which the proximity sensor recognizes access of an object, and a second time of change at which access of the object is cancelled, and
wherein the coupling controller hardware device performs coupling with the user equipment in accordance with whether or not the first time of change corresponds to a time prior to the time of recognition and whether or not the second time of change corresponds to a time after the time of cancellation.

8. The device of claim 1, wherein the coupling controller hardware device transmits a device search message to a peripheral device existing within a predetermined distance range, the device search message being used for searching the user equipment, or wherein the coupling controller hardware device requests a server for a transmission of the device search message by using a user equipment list, the server including a user equipment list related to the display device, when the content transfer request is recognized.

9. The device of claim 1, comprising:
an optical radiation device, and
wherein the coupling controller hardware device is configured:
to recognize a device search message as the content transfer request, when a device search message is received from an external source, and to drive the optical radiation device in accordance with a unique code, and
to perform coupling with the user equipment by using the unique code and recognition information acquired by a camera, when the recognition information acquired by the camera included in the user equipment is received from the user equipment.

10. The device of claim 9, wherein the recognition information includes a code value, wherein the code value recovers an optical signal pattern in accordance with the driving of the optical radiation device, by having the user equipment analyze a camera image, and
wherein the coupling controller hardware device compares the unique code and the recovering code value, and wherein the coupling controller hardware device performs coupling with the user equipment based upon the compared result.

11. The device of claim 9, wherein the optical radiation device uses any one of an infrared ray (IR) emitter, an ultraviolet (UV) emitter, and a visible ray emitter.

12. A display device, comprising:
a coupling controller hardware device configured to identify a user equipment in accordance with a content transfer request and to perform coupling with the identified user equipment;
a content transfer unit configured to transmit content to the user equipment or to receive content from the user equipment, when coupling is completed; and
a photo sensor,
wherein the coupling controller hardware device is configured to:
recognize a specific screen recognized by the photo sensor as the content transfer request and to request for status information to a peripheral device, and
compare the specific screen with a screen status, when information on the screen status of the user equipment is received from the user equipment as the status information, and to perform coupling with the user equipment based upon the compared result,
wherein the user equipment displays a signal having a specific form, when a status value of a proximity sensor recognizing access of an object is changed, and
wherein the coupling controller hardware device recognizes a screen of the user equipment through the photo sensor.

13. A display device, comprising:
a coupling controller hardware device configured to identify a user equipment in accordance with a content transfer request and to perform coupling with the identified user equipment;
a content transfer unit configured to transmit content to the user equipment or to receive content from the user equipment, when coupling is completed; and
a display configured to receive a touch input,
wherein the coupling controller hardware device is configured:
to identify a touch input on the display as the content transfer request and to request for status information to a peripheral device, and
to perform coupling with the user equipment by using surface area information, when the surface area information related to hovering input of the user equipment is received from the user equipment as the status information,
wherein a hovering input occurs in the user equipment in accordance with a change in capacitance of a touchscreen, and
wherein the coupling controller hardware device performs coupling with the user equipment in accordance with whether or not a surface area of the hovering input of the user equipment is equal to or larger than a predetermined size.

* * * * *